US010155904B2

(12) United States Patent
Miyagawa

(10) Patent No.: US 10,155,904 B2
(45) Date of Patent: Dec. 18, 2018

(54) POLYMERIZABLE LIQUID CRYSTAL COMPOSITION AND OPTICAL ANISOTROPICAL BODY THEREOF

(71) Applicants: JNC CORPORATION, Tokyo (JP); JNC PETROCHEMICAL CORPORATION, Tokyo (JP)

(72) Inventor: Nagahisa Miyagawa, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 47 days.

(21) Appl. No.: 15/183,802

(22) Filed: Jun. 16, 2016

(65) Prior Publication Data
US 2016/0369166 A1    Dec. 22, 2016

(30) Foreign Application Priority Data

Jun. 17, 2015    (JP) .................................. 2015-122275

(51) Int. Cl.
*C09K 19/32*    (2006.01)
*C09K 19/52*    (2006.01)
(Continued)

(52) U.S. Cl.
CPC .......... *C09K 19/32* (2013.01); *C09K 19/2007* (2013.01); *G02B 5/3016* (2013.01);
(Continued)

(58) Field of Classification Search
CPC .................. C09K 19/52; C09K 19/542; C09K 2019/0448; C09K 2019/546; C09K 2019/548

See application file for complete search history.

(56) References Cited

U.S. PATENT DOCUMENTS

| | | | | |
|---|---|---|---|---|
| 5,386,002 A | * | 1/1995 | Inbasekaran | ......... C07D 209/48 |
| | | | | 528/125 |
| 5,863,457 A | | 1/1999 | Hasebe et al. | |

(Continued)

FOREIGN PATENT DOCUMENTS

| | | |
|---|---|---|
| JP | 07-294735 | 11/1995 |
| JP | 10-319408 | 12/1998 |

(Continued)

OTHER PUBLICATIONS

Yu et al., "A New Polarizer with Wide Viewing Angle and Low Color Shift Characteristics designed for In-Plane-Switching Liquid Crystal Display (IPS-LCD)", IDW'04 FMCS-4, 2004, pp. 655-658.

(Continued)

*Primary Examiner* — Mark Kopec
(74) *Attorney, Agent, or Firm* — JCIPRNET

(57) ABSTRACT

A polymerizable liquid crystal composition is presented which can form a polymer that allows formation of a uniform homeotropic alignment even without forming an alignment film on the supporting substrate and has excellent chemical strengths such as heat resistance and solvent resistance.

The polymerizable liquid crystal composition includes at least one type of polyfunctional polymerizable liquid crystal compound and a cardo-type fluorene monomer, wherein based on a total amount of the polyfunctional polymerizable liquid crystal compound, a content of a monofunctional polymerizable liquid compound is less than 5.0% by weight.

14 Claims, 1 Drawing Sheet

(51) Int. Cl.
*C09K 19/20* (2006.01)
*G02B 5/30* (2006.01)
*C09K 19/04* (2006.01)

(52) U.S. Cl.
CPC ............ *C09K 2019/0448* (2013.01); *C09K 2019/2078* (2013.01)

(56) References Cited

U.S. PATENT DOCUMENTS

| | | | |
|---|---|---|---|
| 6,379,758 | B1 | 4/2002 | Hanmer et al. |
| 7,812,905 | B2 * | 10/2010 | Sekiguchi ......... G02F 1/133555 349/114 |
| 9,540,567 | B2 * | 1/2017 | Miyagawa ............. C09K 19/52 |
| 2005/0128395 | A1 | 6/2005 | Coates et al. |
| 2005/0224754 | A1 | 10/2005 | Hirai et al. |
| 2006/0114392 | A1 | 6/2006 | Tanaka |
| 2006/0182900 | A1 | 8/2006 | Kim et al. |
| 2008/0014374 | A1 | 1/2008 | Hirai |
| 2008/0241431 | A1 | 10/2008 | Hirai |

FOREIGN PATENT DOCUMENTS

| | | |
|---|---|---|
| JP | 2000-514202 | 10/2000 |
| JP | 2002-243942 | 8/2002 |
| JP | 2004-198478 | 7/2004 |
| JP | 2005-196221 | 7/2005 |
| JP | 2006-126757 | 5/2006 |
| JP | 2008-266550 | 11/2008 |
| JP | 2008-266632 | 11/2008 |
| WO | 2004072699 | 8/2004 |
| WO | 2005038517 | 4/2005 |

OTHER PUBLICATIONS

Nakata et al, "P-58: Novel Optical Compensation Films for IPS-LCDs", SID'06, Jun. 2006, pp. 420-423.

* cited by examiner

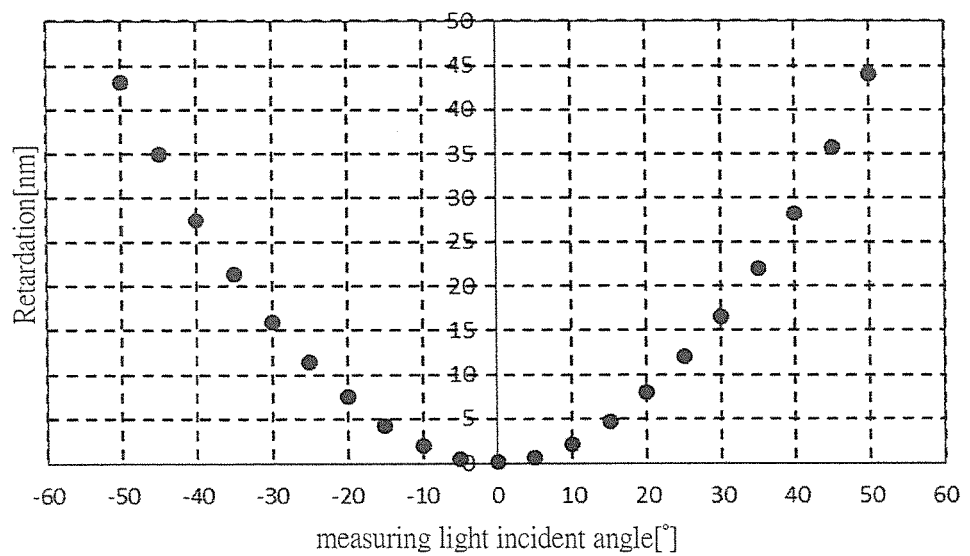

POLYMERIZABLE LIQUID CRYSTAL COMPOSITION AND OPTICAL ANISOTROPICAL BODY THEREOF

CROSS REFERENCE TO RELATED APPLICATIONS

This application claims the priority benefit of Japan application serial no. 2015-122275, filed on Jun. 17, 2015. The entirety of the above-mentioned patent application is hereby incorporated by reference herein and made a part of this specification.

BACKGROUND OF THE INVENTION

1. Field of the Invention

The present invention generally relates to a polymerizable liquid crystal composition and an optical anisotropical body obtained therefrom, and further relates to an optical compensation element and an optical element that uses the optical anisotropical body.

2. Description of Related Art

Polymerizable liquid crystal compounds having a liquid crystal phase can be used to obtain a polymer having optical compensation functions through polymerization. That is, the alignment of the liquid crystal compound is fixed through polymerization. In order to take advantages of the features of such polymers, a variety of polymerizable liquid crystal compounds have been developed.

However, a single polymerizable liquid crystal compound cannot meet sufficient functionality. In patent documents 1-4, compositions were prepared from a variety of polymerizable liquid crystal compounds, wherein the composition was polymerized.

For polymers having homeotropic alignment, the direction of the optical axis is in the $n_z$ direction, and since the refractive index in the optical axis direction is larger than the refractive index in an orthogonal direction, the refractive index ellipsoid is classified as positive C-plate. In non-patent document 1 and non-patent documents 2, 5 and 6, for optical compensation of the liquid crystal mode where the liquid crystals are horizontally aligned during black display or so-called IPS (In-Plane Switching) mode, and the like, for example, in order to improve the viewing angle characteristics of the polarizers, the positive C-plate is combined with films having other optical functions.

In the above applications, there are situations where the polymerizable liquid crystal material is laminated onto a supporting substrate such as glass substrate or plastic substrate. Examples of the materials used as the plastic substrate are such as polymers of TAC (triacetyl cellulose), polycarbonate, PET, acrylic resins and cycloolefin resins.

For making the polymerizable liquid crystal compound to have homeotropic alignment, patent document 7 discloses that when the supporting substrate is a glass substrate, the structure of the polymerizable liquid crystal compound is selected for expressing smectic phase. For making the polymerizable liquid crystal compound to have homeotropic alignment, patent document 8 discloses that lecithin is applied on the glass substrate as a vertical alignment film. In patent documents 1 and 9, an alignment film is formed on the plastic supporting substrate.

In patent documents 10, 11 and 12, even without forming an alignment film on the supporting substrate, methods for preparing a uniform polymerizable liquid crystal compound having homeotropic alignment are disclosed. For instance, patent document 12 discloses a polymerizable liquid crystal compound having a monofunctional polymerizable functional group. However, for the optical anisotropical body obtained by polymerizing the compositions described in patent documents 10, 11 and 12, the anisotropy is lowered due to heat and deterioration is significant due to the contact with solvents.

PATENT DOCUMENTS

Patent Document 1: Japanese Laid Open Publication No. H10-319408
Patent Document 2: Japanese Laid Open Publication No. 2004-198478
Patent Document 3: Japanese Laid Open Publication No. 2002-243942
Patent Document 4: Japanese Laid Open Publication No. 2005-196221
Patent Document 5: PCT International Publication No. 2005/38517
Patent Document 6: US Patent Application Publication No. 2006/182900
Patent Document 7: Japanese Laid Open Publication No. 2000-514202
Patent Document 8: Japanese Laid Open Publication No. H07-294735
Patent Document 9: PCT International Publication No. 2004/72699
Patent Document 10: Japanese Laid Open Publication No. 2006-126757
Patent Document 11: Japanese Laid Open Publication No. 2008-266550
Patent Document 12: Japanese Laid Open Publication No. 2008-266632

NON-PATENT DOCUMENTS

Non-Patent Document 1: M. S. Park et al., IDW '04 FMC8-4
Non-Patent Document 2: M. Nakata et al., SID '06 P-58

SUMMARY OF THE INVENTION

Problems to be Solved

The present invention provides a polymerizable liquid crystal composition which can form a polymer that allows formation of a uniform homeotropic alignment even without forming an alignment film on the supporting substrate and has excellent chemical strengths such as heat resistance and solvent resistance. Additionally, the present invention further provides an alignment controlled liquid crystal layer obtained by the polymerizable liquid crystal composition, an optical anisotropical body formed by polymerizing the polymerizable liquid crystal composition and an optical compensation element that uses the optical anisotropical body.

Means for Solving the Problem

To accomplish the present invention, the inventors have used a cardo-type fluorene monomer as a component of the polymerizable liquid crystal composition, and in the case where the supporting substrate is a glass substrate or a plastic film, even without using a vertical alignment film having long-chain alkyl groups or inorganic materials for surface treatment, the polymerizable liquid crystal compound may be effective in controlling uniform homeotropic alignment, and further, with the combined usage of a specific polymerizable liquid crystal compound, and the composition contains no monofunctional polymerizable liquid crystal compound or contains the monofunctional polymerizable liquid crystal compound in trace amounts, a polymer having significantly improved chemical strengths such as heat resistance and solvent resistance can be produced. Such cardo-type fluorene monomer has at least one or more (meth) acryloyloxy group and is polymerizable in the same manner as the polymerizable liquid crystal compound. The polymer obtained from the polymerizable liquid crystal composition shows a uniform homeotropic alignment, which can achieve the same effect where the polymerizable liquid crystal composition is coated on the supporting substrate through mechanical surface treatment such as rubbing, or through chemical surface treatment. The polymerizable liquid crystal composition is represented by the following [1] items.

[Item 1] A polymerizable liquid crystal composition, comprising: a polyfunctional polymerizable liquid crystal compound and a cardo-type fluorene monomer, wherein based on a total amount of the polyfunctional polymerizable liquid crystal compound, a content of a monofunctional polymerizable liquid compound is less than 5.0% by weight.

[Item 2] The polymerizable liquid crystal composition according to [item 1], wherein the cardo-type fluorene monomer is at least one compound selected from the group of compounds represented by formula (A-1) to (A-6):

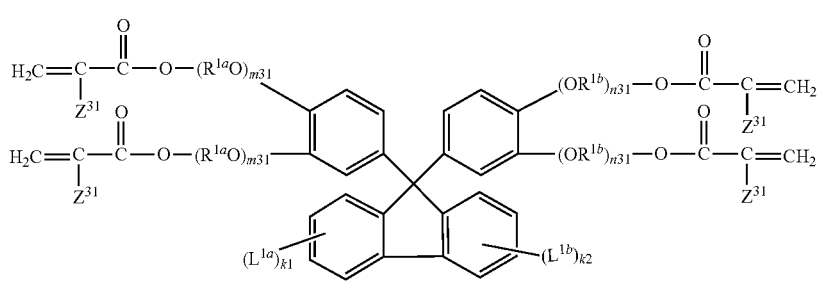

(A-1)

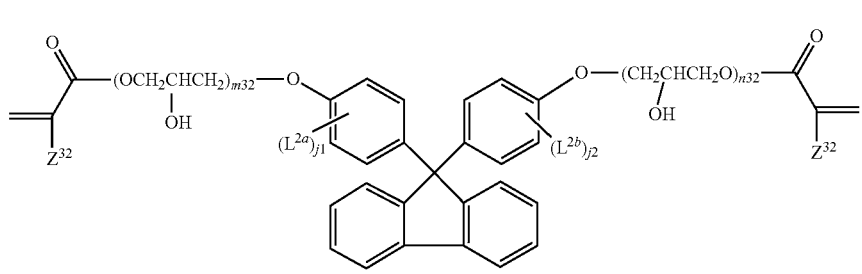

(A-2)

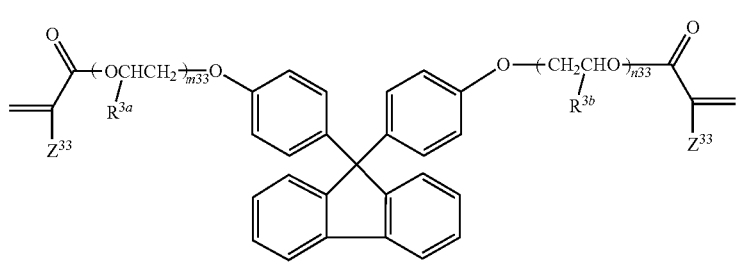

(A-3)

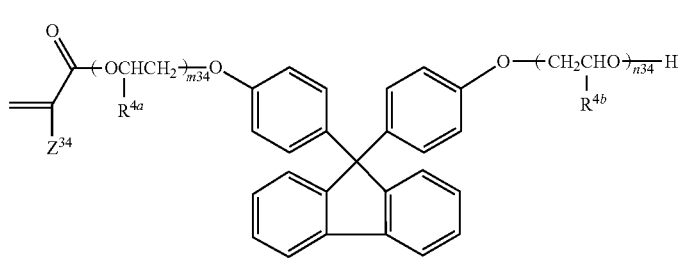

(A-4)

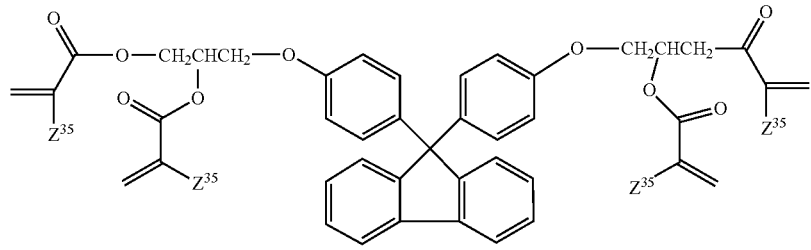
(A-5)

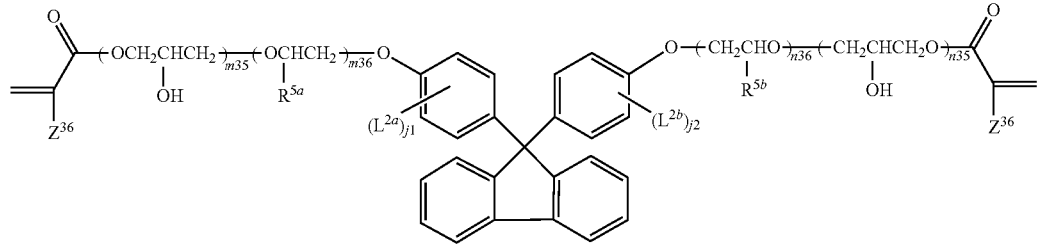
(A-6)

wherein, in formula (A-1), $L^{1a}$ and $L^{1b}$ independently represent alkyl having 1 to 4 carbons, $R^{1a}$ and $R^{1b}$ independently represent alkylene having 2 to 4 carbons, $Z^{31}$ independently represents hydrogen or methyl, k1 and k2 independently represent an integer from 0 to 4, m31 and n31 independently represent an integer from 0 to 6;

in formula (A-2), $Z^{32}$ independently represents hydrogen or methyl, m32 and n32 independently represent an integer from 1 to 3, $L^{2a}$ and $L^{2b}$ independently represent alkyl having 1 to 6 carbon, phenyl or fluorine, j1 and j2 independently represent an integer from 0 to 4;

in formula (A-3), $Z^{33}$ independently represents hydrogen or methyl, $R^{3a}$ and $R^{3b}$ independently represent hydrogen, methyl or ethyl, m33 and n33 independently represent an integer from 0 to 3;

in formula (A-4), $Z^{34}$ represents hydrogen or methyl, $R^{4a}$ and $R^{4b}$ independently represent hydrogen or alkyl having 1 to 6 carbons, m34 and n34 independently represent an integer from 0 to 10;

in formula (A-5), $Z^{35}$ independently represents hydrogen or methyl;

in formula (A-6), $Z^{36}$ independently represents hydrogen or methyl, $R^{5a}$ and $R^{5b}$ independently represent hydrogen or alkyl having 1 to 6 carbons, $L^{2a}$ and $L^{2b}$ independently represent alkyl having 1 to 6 carbons, phenyl or fluorine, j1 and j2 independently represent an integer from 0 to 4, m35 and n35 independently represent an integer from 1 to 3, m36 and n36 independently represent an integer from 1 to 3.

[Item 3] The polymerizable liquid crystal composition according to [item 2], wherein the cardo-type fluorene monomer is at least one compound selected from the group of compounds represented by formula (A-1), formula (A-2), formula (A-3), formula (A-5) and formula (A-6).

[Item 4] The polymerizable liquid crystal composition according to any one of [item 1] to [item 3], wherein a polymerizable functional group of the polyfunctional polymerizable liquid crystal compound is a (meth)acryloxy group.

[Item 5] The polymerizable liquid crystal composition according to any one of [item 1] to [item 4], wherein the polyfunctional polymerizable liquid crystal compound is at least one compound selected from the group of compounds represented by formula (M-1) and formula (M-2):

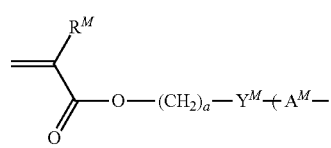
(M-1)

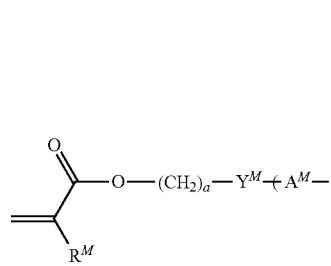
(M-2)

wherein, in formula (M-1) and formula (M-2), $A^M$ independently represents a divalent group selected from 1,4-phenylene, 1,4-cyclohexylene, 1,4-cyclohexenylene, pyridine-2,5-diyl, 1,3-dioxane-2,5-diyl, naphthalene-2,6-diyl or fluorene-2,7-diyl, wherein in the divalent group, at least one hydrogen may be substituted by fluorine, chlorine, cyano, hydroxy, formyl, trifluoroacetyl, difluoromethyl, trifluoromethyl, alkyl having 1 to 5 carbons, alkoxy having 1 to 5 carbons, alkoxycarbonyl having 1 to 5 carbons or alkanoyl having 1 to 5 carbons, $Z^M$ independently represents a single bond, —OCH$_2$—, —CH$_2$O—, —COO—, —OCO—, —COS—, —SCO—, —OCOO—, —CONH—, —NHCO—, —CF$_2$O—, —OCF$_2$—, —CH$_2$CH$_2$—, —CF$_2$CF$_2$—, —CH=CHCOO—, —OCOCH=CH—, —CH$_2$CH$_2$COO—, —OCOCH$_2$CH$_2$—, —CH=CH—, —N=CH—, —CH=N—, —N=CCH$_3$—, —CCH$_3$=N—, —N=N— or —C≡C—, q represents an integer from 1 to 4, c and d independently represents an integer from 0 to 3, wherein 1≤c+d≤4, a independently represents an integer from 0 to 20, $R^M$ independently represent hydrogen or methyl, $Y^M$ independently represent a single bond, —O—, —COO—, —OCO— or —OCOO—, Q represents a single bond, —O—, —COO—, —OCO— or —OCOO—.

[Item 6] The polymerizable liquid crystal composition according to any one of [item 1] to [item 5], wherein based on a total amount of the polymerizable liquid crystal composition, a content of the polyfunctional polymerizable liquid crystal compound is from 3% by weight to 60% by weight.

[Item 7] The polymerizable liquid crystal composition according to any one of [item 1] to [item 6], wherein based on a total amount of the polymerizable liquid crystal composition, a content of the cardo-type fluorene monomer is from 0.01% by weight to 15% by weight.

[Item 8] A polymerizable liquid crystal layer, obtained by applying the polymerizable liquid crystal composition according to any one of [item 1] to [item 7] directly onto a support substrate.

[Item 9] The polymerizable liquid crystal layer according to [item 8], wherein the support substrate is a glass substrate.

[Item 10] The polymerizable liquid crystal layer according to [item 8], wherein the support substrate is a glass substrate coated with plastic thin film or a plastic substrate made of plastic film.

[Item 11] The polymerizable liquid crystal layer according to [item 8], wherein the support substrate is a glass substrate coated with plastic thin film by rubbing treatment, corona treatment or plasma treatment on the surface, or the support substrate is a plastic substrate made of plastic film with rubbing treatment, corona treatment or plasma treatment on the surface.

[Item 12] The polymerizable liquid crystal layer according to [item 10] or [item 11], wherein a plastic of the plastic thin film and the plastic film is at least one selected from polyimide, polyamide-imide, polyamide, polyether-imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resins, polyvinyl alcohol, polypropylene, cellulose, triacetyl cellulose, partially saponified product of triacetyl cellulose, epoxy resins, phenolic resins and cycloolefin resins.

[Item 13] The polymerizable liquid crystal layer according to [item 10] or [item 11], wherein a plastic of the plastic thin film and the plastic film is at least one selected from polyimide, polyvinyl alcohol, triacetyl cellulose, partially saponified product of triacetyl cellulose, acrylic resins, and cycloolefin resins.

[Item 14] The polymerizable liquid crystal layer according to any one of [item 8] to [item 13], wherein an alignment state of the liquid crystal of the polymerizable liquid crystal composition is homeotropic alignment.

[Item 15] A liquid crystal film, obtained by polymerizing the polymerizable liquid crystal layer according to any one of [item 8] to [item 13].

[Item 16] An optical compensation element, comprising the liquid crystal film of [item 15].

[Item 17] An optical element, comprising the liquid crystal film of [item 15] and a polarizer.

Effects of the Invention

By adding a cardo-type fluorene monomer to a specific polymerizable liquid crystal compound, even without using a vertical alignment film having long-chain alkyl groups or inorganic materials for surface treatment, a uniform homeotropic alignment can be obtained. Furthermore, for the optical anisotropical body obtained from the polymerizable liquid crystal composition of the present invention, since it does not contain the monofunctional polymerizable liquid crystal compound used in the production of the conventional optical anisotropical body, or is only contained in trace amounts, therefore, it may be useful in providing good chemical strength and improved reliability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 shows the retardation measurement results of an optical anisotropical body obtained in Example 1.

DESCRIPTION OF THE EMBODIMENTS

Regarding the term "polymerizable", this refers to the ability of polymerization through means such as light, heat or catalyst, such that compounds with larger molecular weights can be provided.

Regarding the term "polymerizable functional group", this refers to a functional group that can be polymerized.

Regarding the term "monofunctional", this refers to the case where only one polymerizable functional group exists in one molecule.

Regarding the term "polyfunctional", this refers to the case where multiple polymerizable functional groups exist in one molecule.

Regarding the term "liquid crystallinity", this refers to being able to become the compounds have a liquid crystal phase or the compounds do not have a liquid crystal phase but is useful as a component in the liquid crystal composition.

Regarding the term "liquid crystal compound", this is a generic term referring to the compounds have a liquid crystal phase or the compounds do not have a liquid crystal phase but is useful as a component in the liquid crystal composition.

Regarding the term "polymerizable liquid crystal compound", this refers to a liquid crystal compound that can be polymerized.

Regarding the term "liquid crystal phase" this is a generic term referring to nematic phase, smectic phase and cholesteric phase.

Regarding the term "liquid crystal lower limit temperature", this refers to the temperature where the liquid crystal phase is transferred into crystals as determined by the experimental methods provided in the present disclosure.

Regarding the term "(meth)acrylic", this is a generic term referring to acrylic and methacrylic.

Regarding the term "(meth)acrylic acid", this is a generic term referring to acrylic acid and methacrylic acid.

Regarding the term "(meth)acrylate", this is a generic term referring to acrylate and methacrylate.

Regarding the term "liquid crystal thin film", this refers to a thin film made from the polymerizable liquid crystal composition.

Regarding the term "liquid crystal film", this refers to a film-like optical anisotropical body formed from the polymerizable liquid crystal composition.

Regarding the term "chemical strength", this refers to the smallness of change in the mechanical properties and optical properties of the target, before and after high temperature load, or before and after immersion in solvent.

The compounds represented by formula (1) may be referred to as compound (1). The compounds represented by other formulas may also be referred using the same simplified method above.

In explaining the structures of compounds, the term "at least one" is not only used to describe at least one position, but also tends to mean that the number is at least one. For example, "at least one of A may be substituted by B, C or D" tends to mean that at least one of A may be substituted by B, at least one of A may be substituted by C and at least one of A may be substituted by D, and further includes the case where a plurality of A may be substituted by at least two of B~D.

As for chemical formulas, as in the case shown below, the straight line from A to B tends to mean a bonding, wherein if hydrogen in A is substituted by group B, this tends to mean a replacement at any position. X indicates the number of the substituted group B. In the case where X is 0, this tends to mean that B does not exist, or that it is not substituted.

[Polymerizable Liquid Crystal Composition]

The polymerizable liquid crystal composition of the present invention includes at least one type of polyfunctional polymerizable liquid crystal compound and a cardo-type fluorene monomer, and based on a total amount of the polyfunctional polymerizable liquid crystal compound, a content of a monofunctional polymerizable liquid compound is less than 5.0% by weight.

[1. Cardo-Type Fluorene Monomer]

Cardo-type fluorene monomers are polymerizable compounds where a fluorene backbone is substituted with two phenyl groups at the 9-position. Furthermore, such compounds have an effect of homeotropic alignment for liquid crystal compounds.

Cardo-type fluorene monomers are compounds including the following formula (A-1) to formula (A-6):

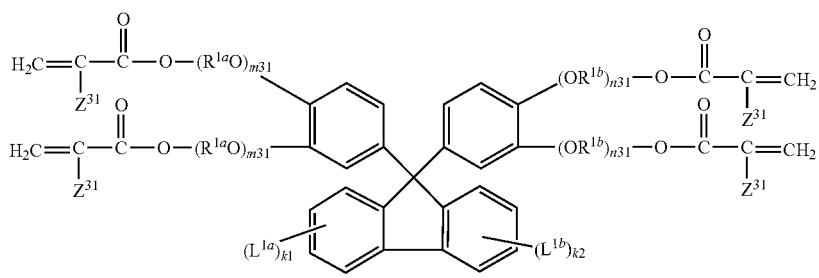

(A-1)

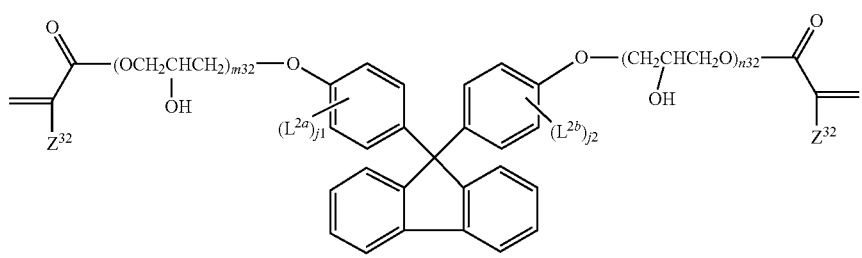

(A-2)

-continued

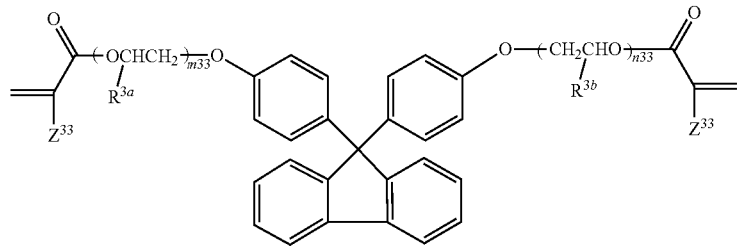
(A-3)

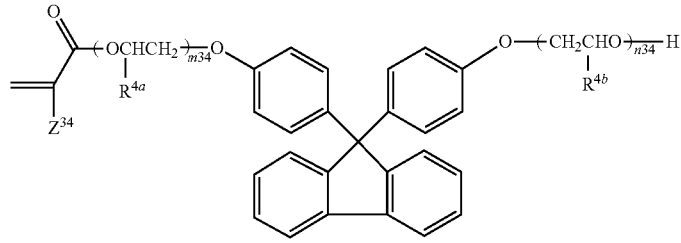
(A-4)

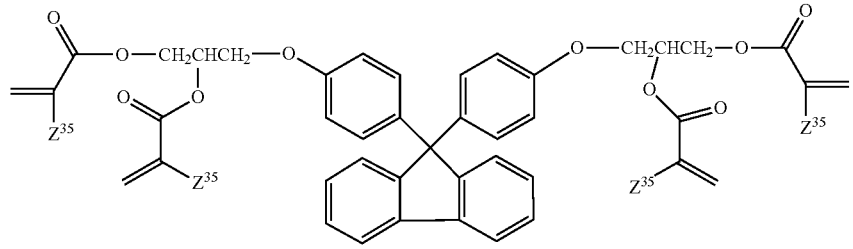
(A-5)

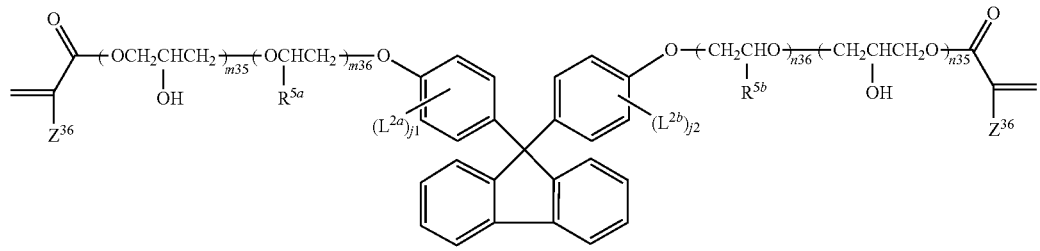
(A-6)

wherein, in formula (A-1), $L^{1a}$ and $L^{1b}$ independently represent alkyl having 1 to 4 carbons, $R^{1a}$ and $R^{1b}$ independently represent alkylene having 2 to 4 carbons, $Z^{31}$ independently represents hydrogen or methyl, k1 and k2 independently represent an integer from 0 to 4, m31 and n31 independently represent an integer from 0 to 6;

in formula (A-2), $Z^{32}$ independently represents hydrogen or methyl, m32 and n32 independently represent an integer from 1 to 3, $L^{2a}$ and $L^{2b}$ independently represent alkyl having 1 to 6 carbon, phenyl or fluorine, j1 and j2 independently represent an integer from 0 to 4;

in formula (A-3), $Z^{33}$ independently represents hydrogen or methyl, $R^{3a}$ and $R^{3b}$ independently represent hydrogen, methyl or ethyl group, m33 and n33 independently represent an integer from 0 to 3;

in formula (A-4), $Z^{34}$ represents hydrogen or methyl, $R^{4a}$ and $R^{4b}$ independently represent hydrogen or alkyl having 1 to 6 carbons, m34 and n34 independently represent an integer from 0 to 10;

in formula (A-5), $Z^{35}$ independently represents hydrogen or methyl;

in formula (A-6), $Z^{36}$ independently represents hydrogen or methyl, $R^{5a}$ and $R^{5b}$ independently represent hydrogen or alkyl having 1 to 6 carbons, $L^{2a}$ and $L^{2b}$ independently represent alkyl having 1 to 6 carbons, phenyl or fluorine, j1 and j2 independently represent an integer from 0 to 4, m35 and n35 independently represent an integer from 1 to 3, m36 and n36 independently represent an integer from 1 to 3.

In formula (A-1), from the viewpoint of heat resistance, preferably, $R^{1a}$ and $R^{1b}$ individually represents an alkylene having 2 to 4 carbons, $Z^{31}$ independently represents hydrogen or methyl, k1 and k2 are respectively 0, and preferably, m31 and n31 independently represent an integer from 0 to 4.

In formula (A-2), from the viewpoint of heat resistance, $Z^{32}$ independently represents hydrogen or methyl, preferably, m32 and n32 independently represent an integer of 1 or 2, and preferably, j1 and j2 are respectively 0.

In formula (A-3), from the viewpoint of heat resistance, $Z^{33}$ independently represents hydrogen or methyl, preferably, $R^{3a}$ and $R^{3b}$ independently represent hydrogen or methyl, and preferably, m33 and n33 independently represent an integer from 0 to 2.

In formula (A-4), from the viewpoint of heat resistance, $Z^{34}$ represents hydrogen or methyl, preferably, $R^{4a}$ and $R^{4b}$ independently represent hydrogen or methyl, and preferably, m34 and n34 independently represent an integer from 0 to 2.

In formula (A-6), from the viewpoint of heat resistance, $Z^{36}$ independently represents hydrogen or methyl, preferably, $R^{5a}$ and $R^{5b}$ independently represent hydrogen or methyl, j1 and j2 are respectively 0, preferably, m35 and n35 independently represent an integer from 1 to 2, and preferably, m36 and n36 independently represent an integer from 1 to 2.

The cardo-type fluorene monomer contained in the polymerizable liquid crystal composition of the present invention may be a single type, or be in multiple combinations.

group, isothiocyanate group, oxetane group, thietanyl group, aziridinyl group, pyrrole group, vinyl group, allyl group, fumarate group, cinnamoyl group, oxazoline group, hydroxyl group, alkoxysilyl group and amino group, and the like. In the case of making a normally used light curing film, in order to increase the hardness, and increase the solubility in the solvents of the polymerizable compound and improve the handling, the polymerizable functional group is preferably an acrylic group or a methacrylic group.

The polyfunctional polymerizable liquid crystal compound are compounds that are represented by formula (M-1) and (M-2).

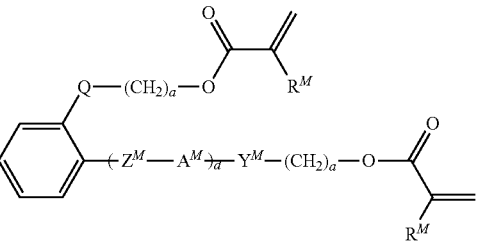

Cardo-type fluorene monomers represented by formula (A-1), formula (A-2), formula (A-3), formula (A-5) and formula (A-6) are preferably used from the viewpoint of heat resistance and solubility. In addition, when the cardo-type fluorene monomers are used in multiple combinations, for example, the combinations of (A-1) and (A-6), (A-2) and (A-3), (A-2) and (A-4), (A-2) and (A-6) or (A-3) and (A-6) are preferable from the view point of heat resistance and solubility.

By considering the solubility, based on a total amount of the polymerizable liquid crystal composition, a content of the cardo-type fluorene monomer in the polymerizable liquid crystal composition is preferably from 0.01% by weight to 15% by weight, and more preferably 0.03% by weight to 10% by weight.

By considering the solubility, based on a total amount of the polyfunctional polymerizable liquid crystal compound, a content of the cardo-type fluorene monomer is preferably 1% by weight to 25% by weight, and more preferably 5% by weight to 20% by weight.

[2. Polymerizable Liquid Crystal Compound]

The main polymerizable liquid crystal compound used in the present invention is polyfunctional. The polymer product obtained from the composition containing the polyfunctional polymerizable liquid crystal compound can have a three dimensional structure. As a result, in comparison to a polymer product obtained from the composition not containing polyfunctional polymerizable liquid crystal compounds, but only contains monofunctional polymerizable liquid crystal compounds, the polymers of the present invention will have an improved hardness, and excellent heat resistance and solvent resistance, and the like.

The aforementioned polymerizable functional groups are for example, carboxyl group, (meth)acrylic group, epoxy group, thiol-epoxy group, mercapto group, isocyanate wherein, in formula (M-1) and formula (M-2), $A^M$ independently represents a divalent group selected from 1,4-phenylene, 1,4-cyclohexylene, 1,4-cyclohexenylene, pyridine-2,5-diyl, 1,3-dioxane-2,5-diyl, naphthalene-2,6-diyl or fluorene-2,7-diyl, wherein in the divalent group, at least one hydrogen may be substituted by fluorine, chlorine, cyano, hydroxy, formyl, trifluoroacetyl, difluoromethyl, trifluoromethyl, alkyl having 1 to 5 carbons, alkoxy having 1 to 5 carbons, alkoxycarbonyl having 1 to 5 carbons or alkanoyl having 1 to 5 carbons, $Z^M$ independently represents a single bond, —OCH$_2$—, —CH$_2$O—, —COO—, —OCO—, —COS—, —SCO—, —OCOO—, —CONH—, —NHCO—, —CF$_2$O—, —OCF$_2$—, —CH$_2$CH$_2$—, —CF$_2$CF$_2$—, —CH=CHCOO—, —OCOCH=CH—, —CH$_2$CH$_2$COO—, —OCOCH$_2$CH$_2$—, —CH=CH—, —N=CH—, —CH=N—, —N=CCH$_3$—, —CCH$_3$=N—, —N=N— or —C≡C—, q represents an integer from 1 to 4, c and d independently represents an integer from 0 to 3, wherein 1≤c+d≤4, a represents an integer from 0 to 20, $R^M$ independently represent hydrogen or methyl, $Y^M$ independently represent a single bond, —O—, —COO—, —OCO— or —OCOO—, Q represents a single bond, —O—, —COO—, —OCO— or —OCOO—.

In the case where q, c, or d is 2 or more, then $A^M$ and $Z^M$ may be different in each repeat.

The compounds represented by formula (M-1) are illustrated below.

(M-1-1)
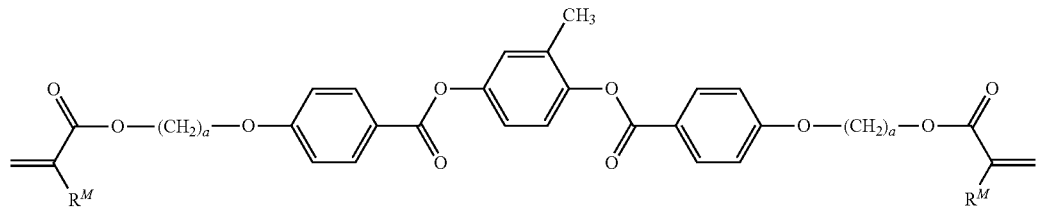
(M-1-2)
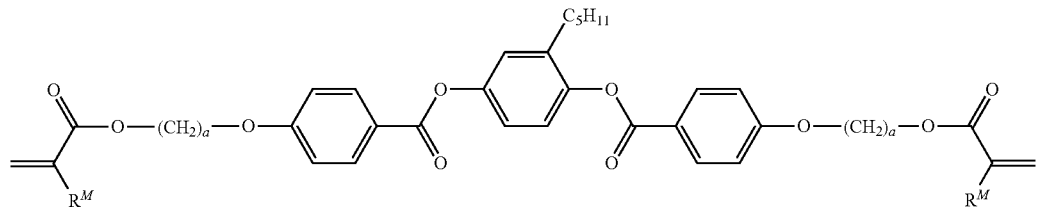
(M-1-3)
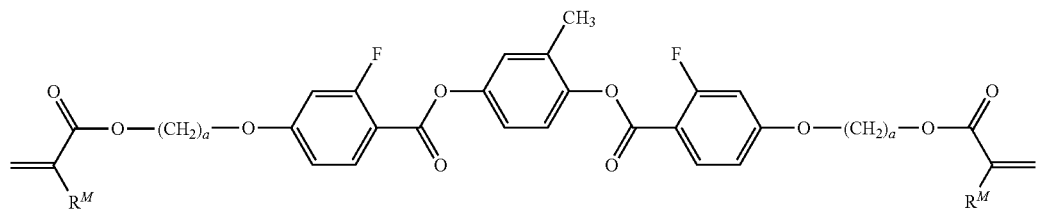
(M-1-4)
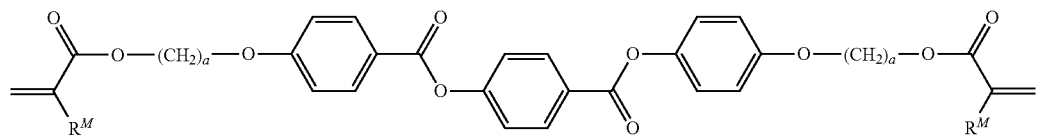
(M-1-5)
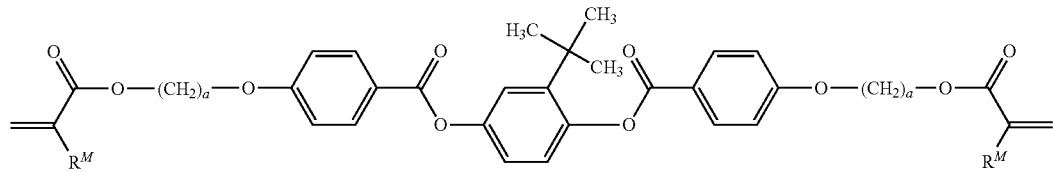
(M-1-6)
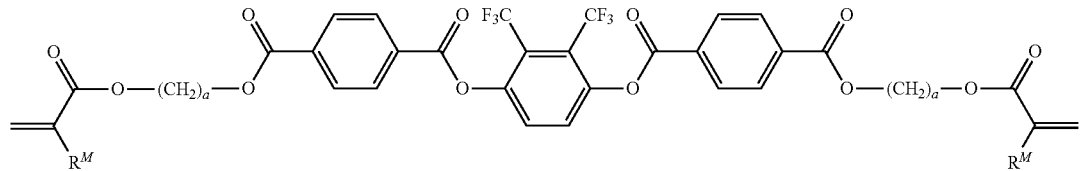
M-1-7
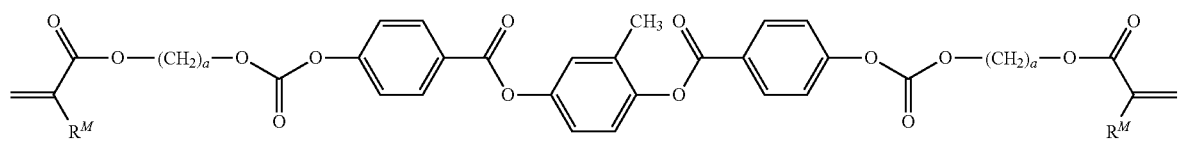
(M-1-8)
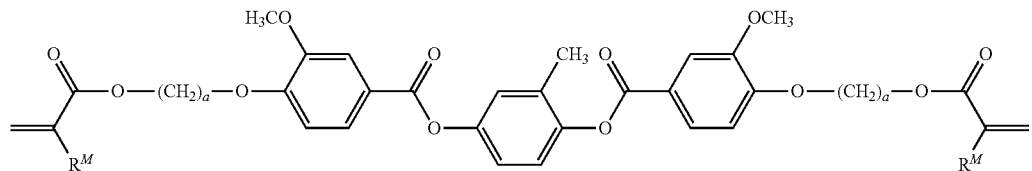

-continued
(M-1-9)
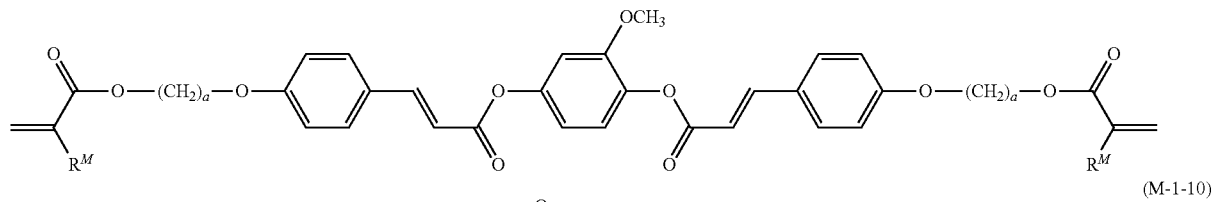
(M-1-10)
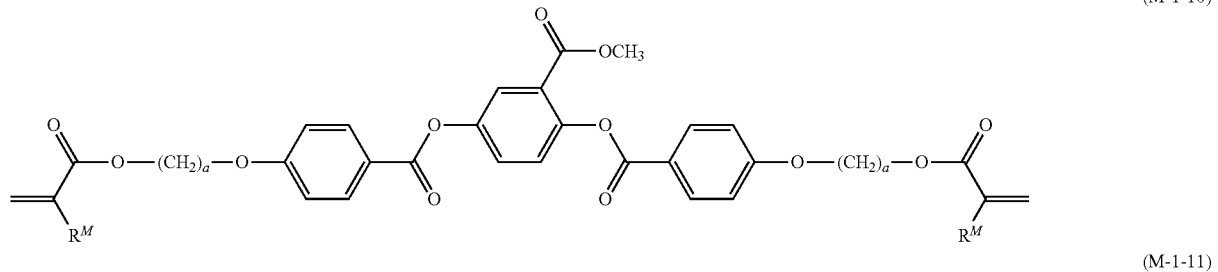
(M-1-11)
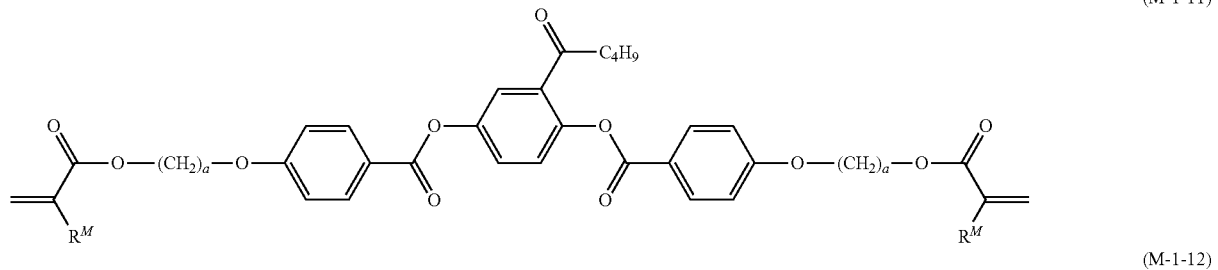
(M-1-12)
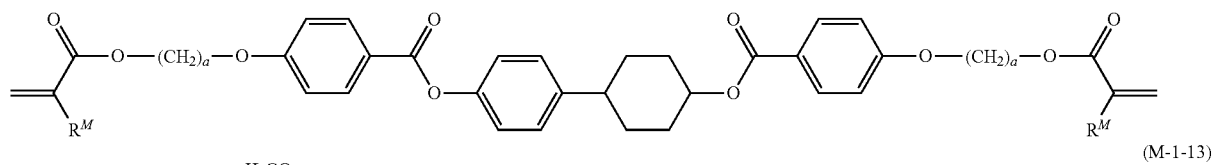
(M-1-13)
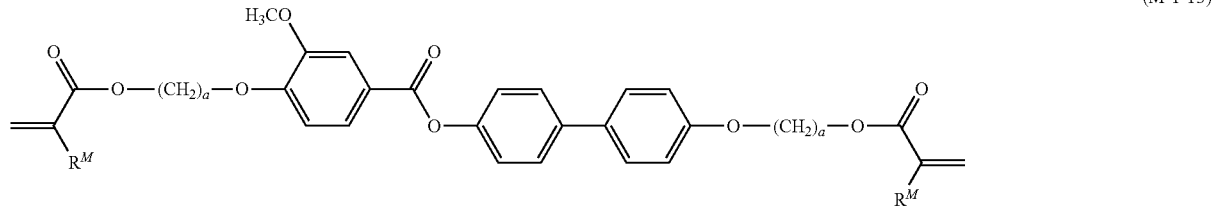
(M-1-14)
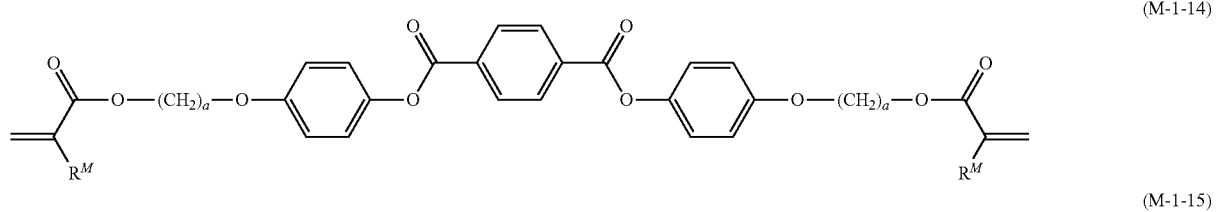
(M-1-15)
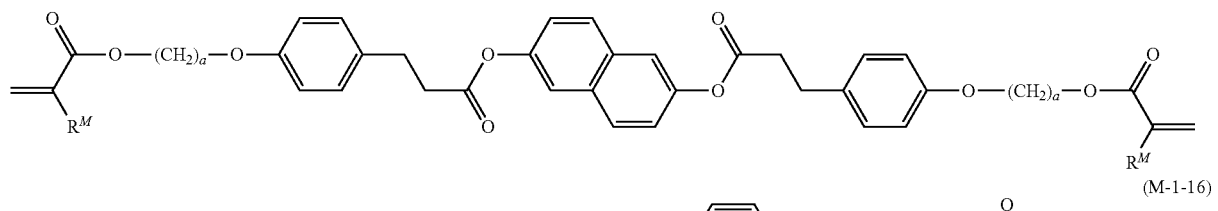
(M-1-16)
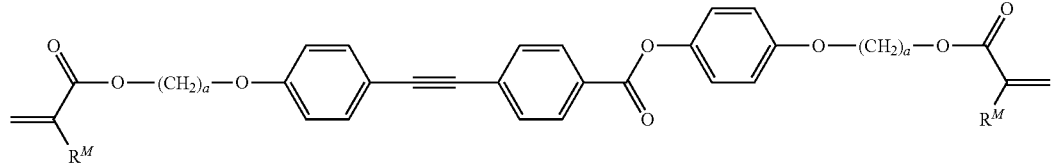

-continued
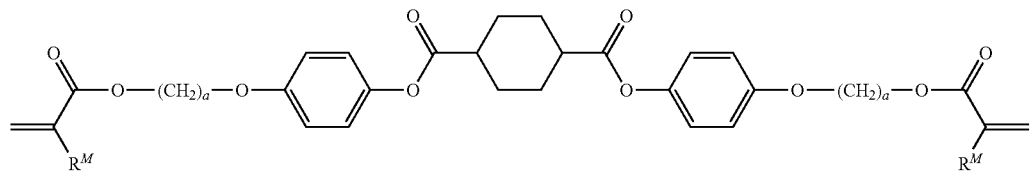
(M-1-17)
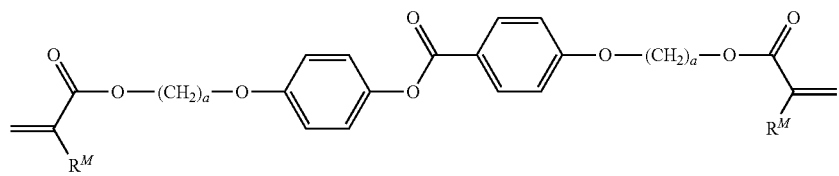
(M-1-18)
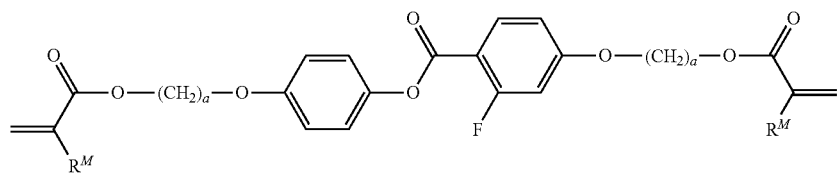
(M-1-19)
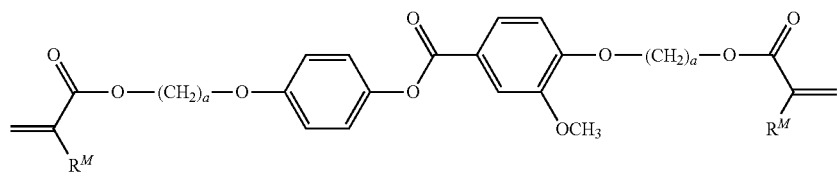
(M-1-20)
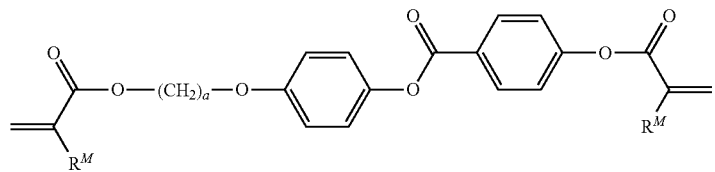
(M-1-21)
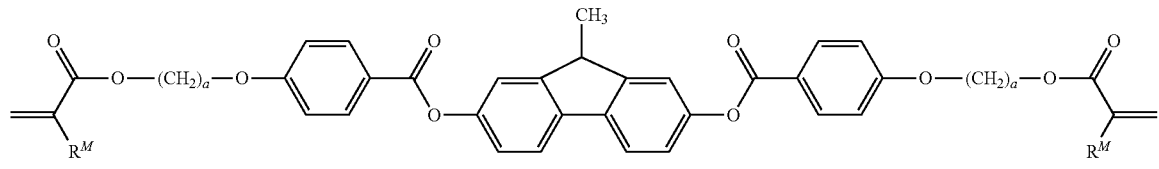
(M-1-22)
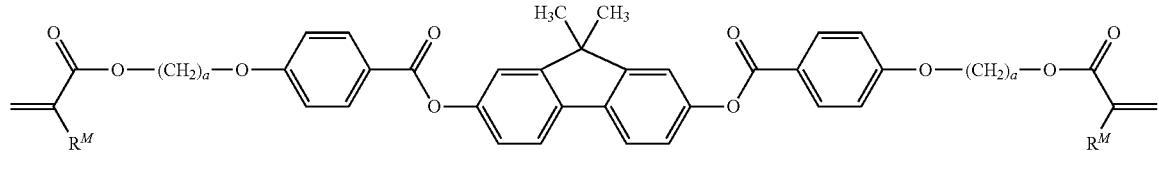
(M-1-23)
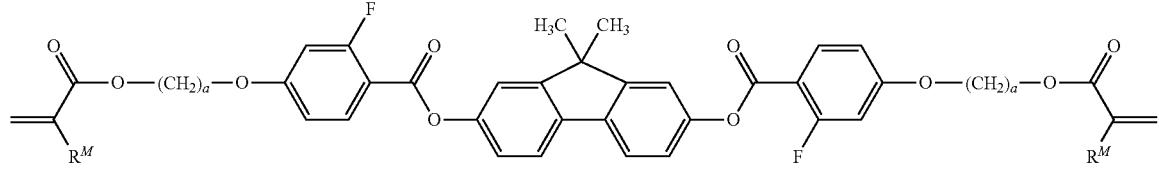
(M-1-24)

(M-1-25)
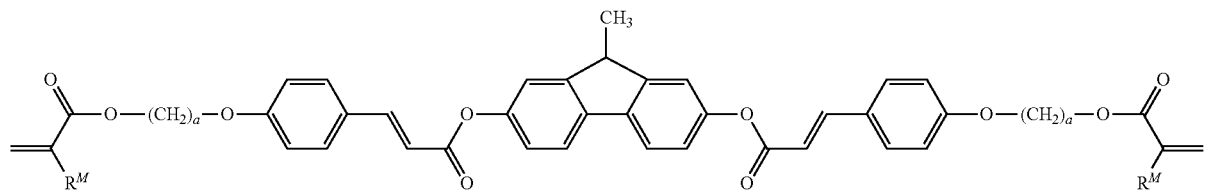
(M-1-26)
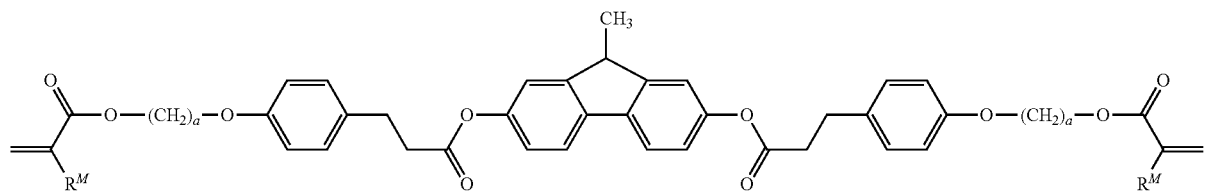
(M-1-27)
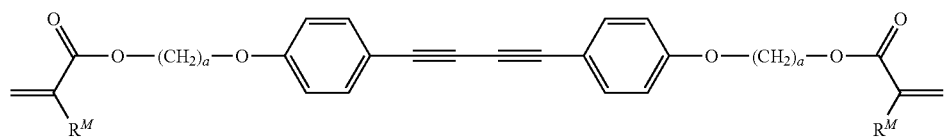
(M-1-28)
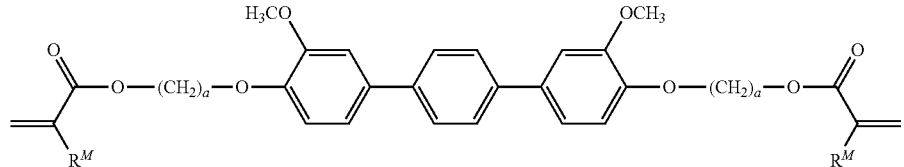
(M-1-29)
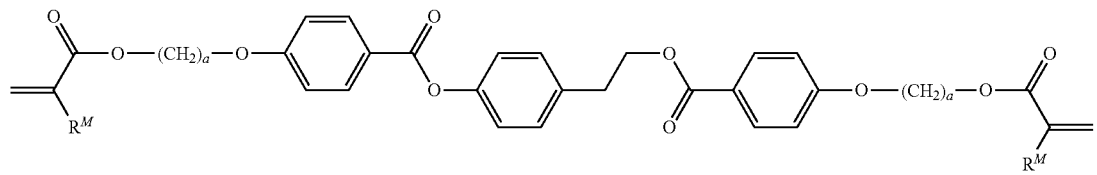
(M-1-30)
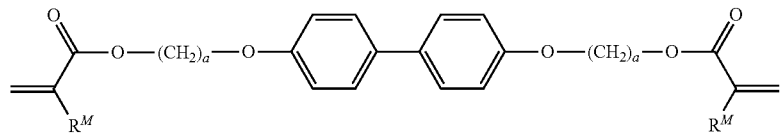
(M-1-31)
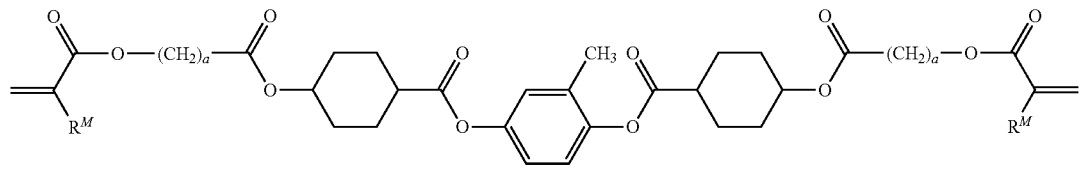
In formula (M-1-1) to (M-1-31), $R^M$ independently represents hydrogen or methyl, a independently represents an integer from 1 to 12.
The compounds represented by formula (M-2) are illustrated below.

(M-2-1)
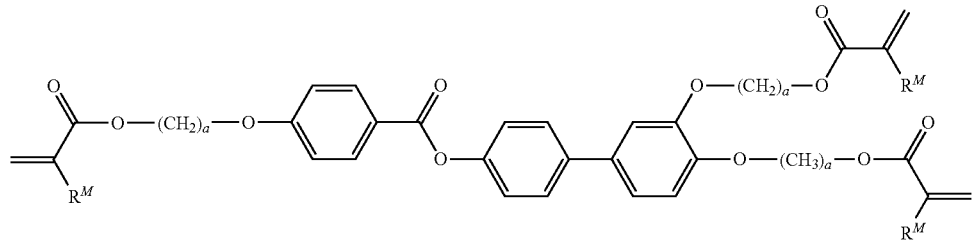
(M-2-2)
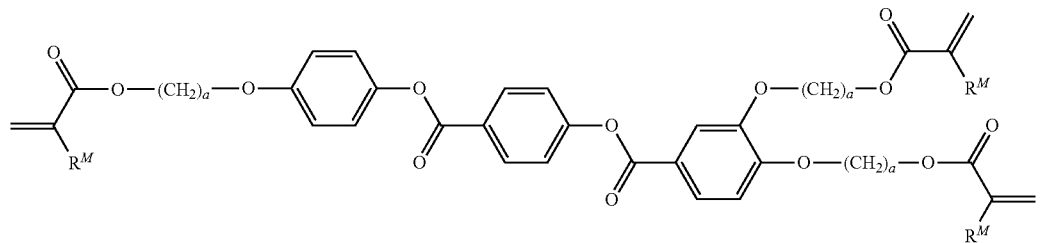
(M-2-3)
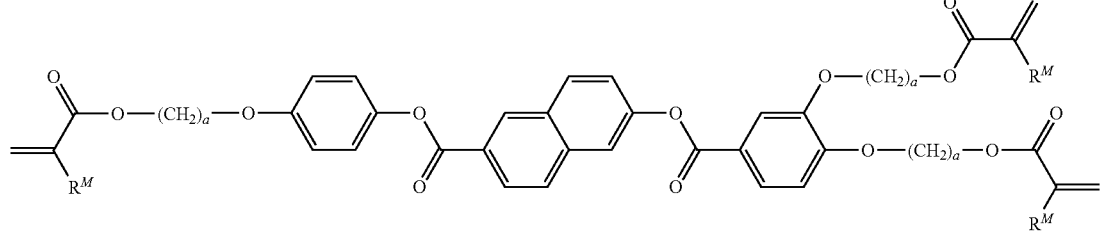
(M-2-4)
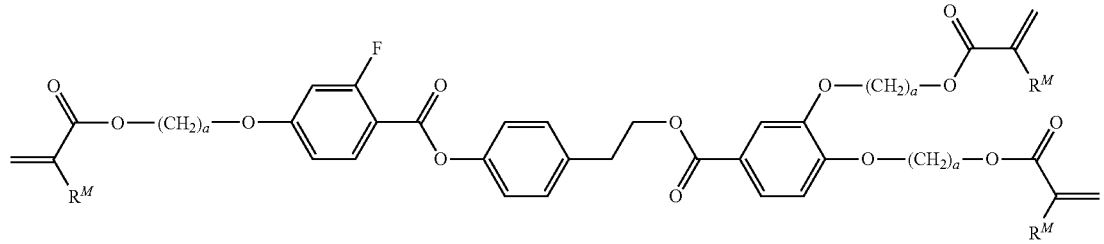
(M-2-5)
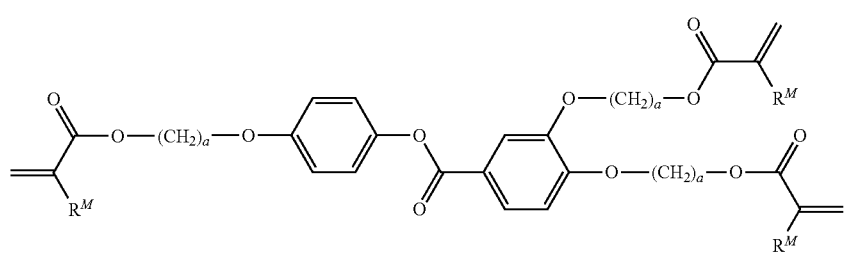
(M-2-6)
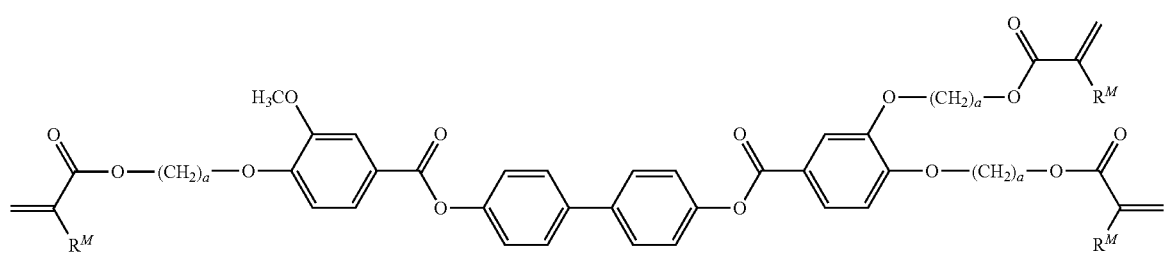

(M-2-7)
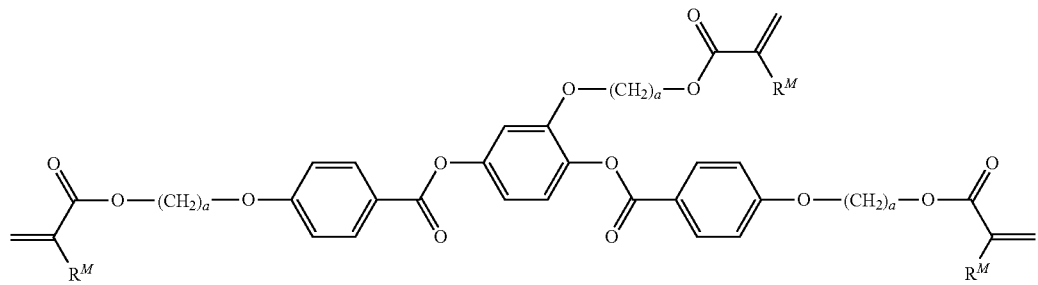
(M-2-8)
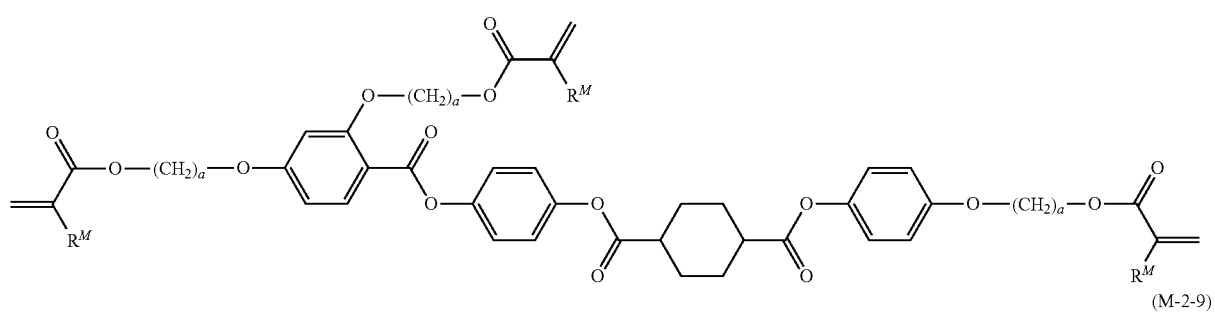
(M-2-9)
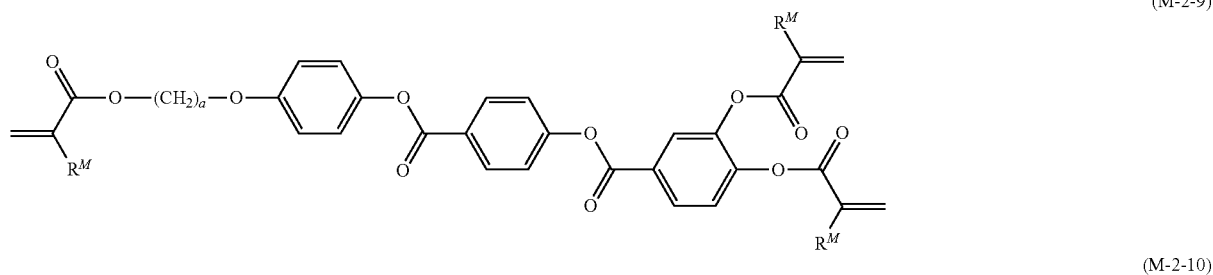
(M-2-10)
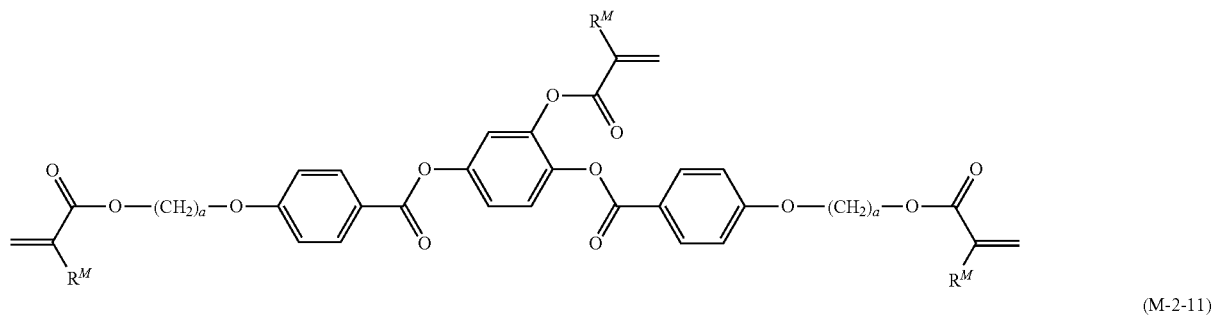
(M-2-11)
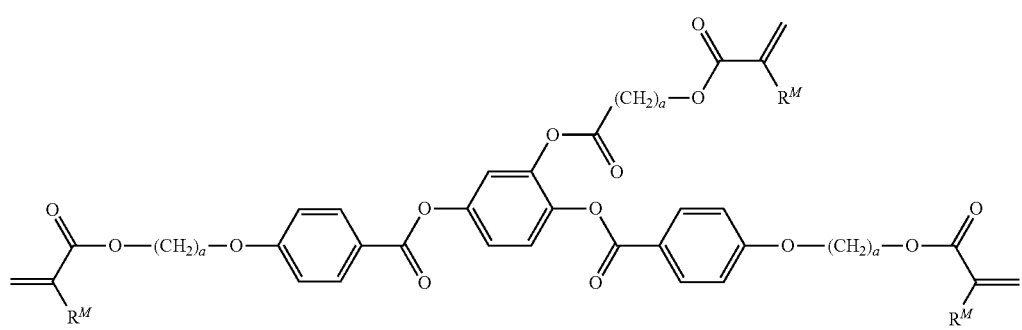
In formula (M-2-1) to (M-2-11), $R^M$ independently represents hydrogen or methyl, a independently represent an integer from 1 to 12.
In the compounds represented by formula (M-1) and (M-2) above, from the viewpoint of heat resistance and solubility, the compounds preferably used are, (M-1-1), (M-1-2), (M-1-7), (M-1-8), (M-1-9), (M-1-10), (M-1-12), (M-1-15), (M-1-22), (M-1-23), (M-1-24), (M-1-25), (M-1-29), (M-1-30), (M-2-1), (M-2-4), (M-2-7), (M-2-10), (M-2-11), and more preferably (M-1-1) and (M-1-2), (M-1-3), (M-1-7), (M-1-8), (M-1-9), (M-1-10), (M-1-12), (M-1-22), (M-1-23), (M-1-24), (M-1-25), (M-1-29), (M-1-30), (M-2-1), (M-2-10), (M-2-11). The above compounds may be used alone or in multiple combinations.

In the liquid crystal composition, from the viewpoint of solubility, based on a total amount of the polymerizable liquid crystal composition, a content of the polyfunctional polymerizable liquid crystal compound represented by formula (M-1) and (M-2) is preferably from 3% by weight to 60% by weight, and more preferably 5% by weight to 50% by weight.

From the viewpoint of improving hardness, and heat resistance and solvent resistance, based on a total amount of the polymerizable liquid crystal compound, it is preferable that the content of a monofunctional polymerizable compound (inclusive of monofunctional polymerizable liquid crystal compound) in the polymerizable liquid crystal composition is less than 5% by weight, more preferably less than 2% by weight, and desirably close to 0.

In conventional polymerizable liquid crystal composition, the monofunctional polymerizable liquid crystal compound is an essential component (for example in patent document 12). In comparison, for the liquid crystal composition of the present invention, even if such component is included, based on a total amount of the polyfunctional polymerizable liquid crystal compound, it is included in an amount of not more than 5% by weight.

Compound represented by formula (2) as described in Patent Document 12 also corresponds to the monofunctional polymerizable liquid crystal compound.

[3. Solvent]

A solvent of the polymerizable liquid crystal composition is prepared such that the coating becomes easy. The solvent of the solution is for example, ester solvents, amide solvents, alcohol solvents, ether solvents, glycol monoalkyl ether solvents, aromatic hydrocarbon solvents, halogenated aromatic hydrocarbon solvents, aliphatic hydrocarbon solvents, halogenated aliphatic hydrocarbon solvents, alicyclic hydrocarbon solvents, ketone solvents, acetate solvents and diacetate solvents, and the like.

Examples of the ester solvents are such as, alkyl acetate, ethyl trifluoroacetate, alkyl propionate, alkyl butyrate, dialkyl malonate, alkyl glycolate, alkyl lactate, monoacetin, γ-butyrolactone and γ-valerolactone, and the like. Alkyl acetate are such as methyl acetate, ethyl acetate, propyl acetate, isopropyl acetate, butyl acetate, 3-methoxybutyl acetate, isobutyl acetate, pentyl acetate and isopentyl acetate, and the like. Alkyl propionate are such as methyl propionate, methyl 3-methoxypropionate, ethyl propionate, propyl propionate and butyl propionate, and the like. Alkyl butyrate are such as methyl butyrate, ethyl butyrate, butyl butyrate, isobutyl butyrate and propyl butyrate, and the like. Dialkyl malonate are such as diethyl malonate, and the like. Alkyl glycolate are such as, methyl glycolate and ethyl glycolate, and the like. Alkyl lactate are such as methyl lactate, ethyl lactate, isopropyl lactate, n-propyl lactate, butyl lactate and ethylhexyl lactate, and the like.

Examples of amide solvents are such as N-methyl-2-pyrrolidone, N,N-dimethylacetamide, N-methyl-propionamide, N,N-dimethylformamide, N,N-diethylformamide, N,N-diethyl acetamide, N,N-dimethylacetamide dimethyl acetal, N-methyl-caprolactam, and dimethyl imidazolidinone, and the like.

Examples of alcohol solvents are such as methanol, ethanol, 1-propanol, 2-propanol, 1-methoxy-2-propanol, t-butyl alcohol, sec-butyl alcohol, butanol, 2-ethyl butanol, n-hexanol, n-heptanol, n-octanol, 1-dodecanol, ethylhexanol, 3,5,5-trimethyl hexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxy butanol, cyclohexanol and methyl cyclohexanol, and the like.

Examples of ether solvents are such as ethylene glycol dimethyl ether, diethylene glycol dimethyl ether, bis(2-propyl) ether, 1,4-dioxane and tetrahydrofuran (THF), and the like.

Examples of glycol monoalkyl ether solvents are such as, ethylene glycol monoalkyl ethers, diethylene glycol monoalkyl ethers, triethylene glycol monoalkyl ethers, propylene glycol monoalkyl ether, dipropylene glycol monoalkyl ethers, ethylene glycol monoalkyl ether acetates, diethylene glycol monoalkyl ether acetate, triethylene glycol monoalkyl ether acetates, propylene glycol monoalkyl ether acetate, dipropylene glycol monoalkyl ether acetate, diethylene glycol methyl ethyl ether, and the like. Ethylene glycol monoalkyl ethers are such as ethylene glycol monomethyl ether and ethylene glycol monobutyl ether, and the like. Diethylene glycol monoalkyl ethers are such as diethylene glycol monoethyl ether, and the like. Propylene glycol monoalkyl ethers are such as propylene glycol monobutyl ether, and the like. Dipropylene glycol monoalkyl ethers are such as dipropylene glycol monomethyl ether, and the like. Ethylene glycol monoalkyl ether acetate are such as ethylene glycol monobutyl ether acetate, and the like. Diethylene glycol monoalkyl ether acetate are such as diethylene glycol monoethyl ether acetate, and the like. Propylene glycol monoalkyl ether acetate are such as propylene glycol monomethyl ether acetate, propylene glycol monoethyl ether acetate and propylene glycol monobutyl ether acetate, and the like. Dipropylene glycol monoalkyl ether acetate are such as dipropylene glycol monomethyl ether acetate, and the like.

Examples of aromatic hydrocarbon solvents are such as benzene, toluene, xylene, mesitylene, ethylbenzene, diethylbenzene, i-propylbenzene, n-propylbenzene, t-butyl benzene, s-butyl benzene, n-butyl benzene, and tetralin. Preferred examples of halogenated aromatic hydrocarbon solvents are such as chlorobenzene, and the like. The aliphatic hydrocarbon solvents are preferably hexane and heptane, and the like. The halogenated aliphatic hydrocarbon solvents are preferably chloroform, dichloromethane, carbon tetrachloride, dichloroethane, trichlorethylene and tetrachlorethylene, and the like. The alicyclic hydrocarbon solvents are such as cyclohexane and decalin, and the like.

Examples of Ketone solvents are such as acetone, methyl ethyl ketone, methyl isobutyl ketone, cyclohexanone, cyclopentanone and methyl propyl ketone, and the like.

Examples of acetate solvents are such as ethylene glycol monomethyl ether acetate, propylene glycol monomethyl ether acetate, propylene glycol monoethyl ether acetate, methyl acetoacetate and 1-methoxy-2-propyl acetate, and the like.

Examples of diacetate solvents are such as propylene glycol diacetate, 1,4-butanediol diacetate and 1,3-butylene glycol diacetate, and the like.

From the viewpoint of solubility of the liquid crystal compound, the use of amide solvents, aromatic hydrocarbon solvents and ketone solvents are preferred, and by considering the boiling point of the solvent, the combined use of ester solvents, alcohol solvents, ether solvents, glycol monoalkyl ether solvents are also preferred. In the case where plastic substrate is used, in order to prevent the corrosion of the plastic, aromatic hydrocarbon solvents, ketone solvents, ester solvents, ether solvents, alcohol solvents, acetate solvents, glycol monoalkyl ether solvents are preferred.

From the viewpoint of solubility, based on a total amount of the polymerizable liquid crystal composition, the solvent of the polymerizable liquid crystal composition of the present invention is preferably 40% by weight to 97% by weight, and more preferably 50% by weight to 95% by weight.

The above solvents may be used alone, or may be used in a combination of two or more.

[4. Surfactants]

The polymerizable liquid crystal composition of the present invention may further comprises surfactants. Due to the effect of improving the smoothness of the coating film formed from the polymerizable liquid crystal composition, nonionic surfactants are preferred.

Nonionic surfactants are for example, silicone based nonionic surfactants, fluorine based nonionic surfactants, hydrocarbon based nonionic surfactants, and the like.

Silicone based nonionic surfactants are for example, by having non-modified silicone or modified silicone as the main component, such as Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270, Polyflow KL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-342, BYK-344, BYK-345, BYK-346, BYK-347, BYK-348, BYK-370, BYK-375, BYK-377, BYK-378, BYK-3500, BYK-3510 and BYK-3570, and the like, manufactured by Kyoeisha Chemical Co., Ltd.

Fluorine based nonionic surfactants are for example, BYK-340, FTERGENT 251, FTERGENT 221MH, FTERGENT 250, FTX-215M, FTX-218M, FTX-233M, FTX-245M, FTX-290M, FTX-209F, FTX-213F, FTERGENT 222F, FTX-233F, FTX-245F, FTX-208G, FTX-218G, FTX-240G, FTX-206D, FTERGENT 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M, and KB-FaM, and the like.

Hydrocarbon based nonionic surfactants are for example, by having acrylic polymer as the main component such as, Polyflow No. 3, Polyflow No. 50EHF, Polyflow No. 54N, Polyflow No. 75, Polyflow No. 77, Polyflow No. 85HF, Polyflow No. 90, Polyflow No. 95, Polyflow No. 99C, BYK-350, BYK-352, BYK-354, BYK-355, BYK-358N, BYK-361N, BYK-380N, BYK-381, BYK-392, and BYK-Silclean 3700, and the like.

Furthermore, the surfactant may have a polymerizable functional group in order for it to be integrated with the polymerizable liquid crystal compound. The polymerizable functional groups that may be introduced into the surfactant are such as UV-reactive functional groups and thermal polymerizable functional groups. From the viewpoint of the reactivity with polymerizable liquid crystal compounds, UV-reactive functional groups are preferred.

To optimize the wettability of the substrate, surfactants that are classified as wetting agents may be used in combination. The wetting agents may reduce the surface tension of the polymerizable liquid crystal composition, and may improve the wettability of the coated substrate. Examples of such wetting agents are such as, the Polyflow series (KL-100, KL-700, LE-604, LE-605, LE-606), TEGO Twin Series (4000), TEGO Wet Series (KL245, 250, 260, 265, 270, 280, 500, 505, 510), and the like. Furthermore, as an adjuvant of the wetting agent, a surfactant having a fluoride-modified polymer or a fluorine-modified acrylic polymer as the main component may also be suitably used. These are such as the 3000 series (for example 3277, 3700, 3770, etc.) manufactured by AFCONA Co. Ltd.

It should be noted that both of the above Polyflow and Glanol are the registered trademark names being used and sold by Kyoeisha Chemical Co. Ltd. BYK is the registered trademark name being used and sold by BYK Japan Co. Ltd. FTERGENT, FTX and KB are the registered trademark names being used and sold by Neos Co. Ltd.

The above surfactant may be used alone, or may be used in a combination of 2 or more.

[Other Polymerizable Compounds]

Examples of other polymerizable compounds may include compounds that do not have liquid crystallinity such as vinyl derivatives, styrene derivatives, (meth)acrylic acid derivatives, oxirane derivative, oxetane derivatives, sorbic acid derivatives, fumaric acid derivatives and itaconic acid derivatives, and the like. These compounds that do not have liquid crystallinity are compounds having one polymerizable functional group, compounds having two polymerizable functional group and compounds having three polymerizable functional group.

The other polymerizable compounds may be added as long as it maintains a liquid crystal phase. In view of heat resistance, it is preferable that the other polymerizable compounds have a weight ratio of 0.1 or less relative to the weight of the polyfunctional polymerizable liquid crystal compound as in the compounds represented by formula (M-1) and (M-2), and in the case where other liquid crystal compounds and other polymerizable liquid crystal compounds are present, it is preferable that the other polymerizable compounds have a weight ratio of 0.1 or less relative to the total weight of other liquid crystal compounds and other polymerizable liquid crystal compounds with the polyfunctional polymerizable liquid crystal compounds such as those represented by formula (M-1) and (M-2). Furthermore, in order to maintain chemical strength, it is preferable that two or more polymerizable functional groups are present for forming a polymer having three dimensional structure.

Examples of monofunctional compounds are such as styrene, nucleus-substituted styrene, acrylonitrile, vinyl chloride, vinylidene chloride, vinyl pyridine, N-vinylpyrrolidone, vinylsulfonic acid, fatty acid vinyl (e.g. vinyl acetate), a, β-ethylenically unsaturated carboxylic acids (e.g. acrylic acid, methacrylic acid, maleic acid, fumaric acid, itaconic acid, etc.), alkyl esters of (meth)acrylic acid (alkyl having 1 to 18 carbons), hydroxyalkyl esters of (meth) acrylic acid (hydroxyalkyl having 1 to 18 carbons), aminoalkyl esters of (meth)acrylic acid (aminoalkyl having 1 to 18 carbons), ether oxygen-containing alkyl ester of (meth) acrylic acid (ether oxygen-containing alkyl having 3 to 18 carbons, e.g. methoxyethyl ester, ethoxyethyl ester, methoxypropyl ester, methylcarbyl ester, ethylcarbyl ester and butylcarbyl ester), N-vinyl acetamide, p-t-butyl vinyl benzoate, N,N-dimethylamino vinyl benzoate, vinyl benzoate, vinyl pivalate, 2,2-dimethyl butanoic acid vinyl ester, 2,2-dimethyl pentanoic acid vinyl ester, 2-methyl-2-butanoic acid vinyl ester, vinyl propionate, vinyl stearate, 2-ethyl-2-methylbutanoic acid vinyl ester, dicyclopentanyloxyethyl (meth)acrylate, isobornyloxyethyl (meth)acrylate, isobornyl (meth)acrylate, adamantyl (meth)acrylate, dimethyl adamantyl (meth)acrylate, dicyclopentanyl (meth) acrylate, dicyclopentenyl (meth)acrylate, 2-acryloyloxyethyl succinate, 2-acryloyloxyethyl hexahydrophthalic acid, 2-acryloyloxyethyl phthalic acid, 2-acryloyloxyethyl-2-hydroxyethyl phthalic acid, 2-acryloyloxyethyl acid phosphate, 2-methacryloyloxyethyl acid phosphate, mono(meth) acrylic acid ester or di(meth)acrylic acid ester of polyalkylene glycol having a degree of polymerization of 1-100 such as polyethylene glycol, polypropylene glycol, and copolymer of ethylene oxide and propylene oxide, etc., mono(meth)acrylic acid ester of polyalkylene glycol having a degree of polymerization of 1-100 such as polyethylene glycol, polypropylene glycol, and copolymer of ethylene oxide and propylene oxide, etc. and with terminal capping by an alkyl group having 1 to 6 carbons, and the like.

Examples of compounds having two polymerizable functional groups are such as, 1,4-butanediol diacrylate, 1,6-hexanediol diacrylate, 1,9-nonanediol diacrylate, neopentyl glycol diacrylate, dimethylol tricyclodecane diacrylate, triethylene glycol diacrylate, dipropylene glycol diacrylate, tripropylene glycol diacrylate, tetraethylene glycol diacrylate, bisphenol A EO-added diacrylate, bisphenol A glycidyl diacrylate (Viscoat V #700), polyethylene glycol diacrylate and methacrylate compounds of the above, and the like.

Examples of compounds having three polymerizable functional groups are such as, pentaerythritol tri(meth)acrylate, trimethylolpropane tri(meth)acrylate, trimethylol EO-added tri(meth)acrylate, tris(meth)acryloyloxyethyl phosphate, tris((meth)acryloyloxyethyl) isocyanurate, alkyl-modified dipentaerythritol tri(meth)acrylate, EO-modified trimethylolpropane tri(meth)acrylate, PO-modified trimethylolpropane tri(meth)acrylate, pentaerythritol tetra(meth) acrylate, alkyl-modified dipentaerythritol tetra(meth)acrylate, ditrimethylolpropane tetra(meth)acrylate, dipentaerythritol hexa(meth)acrylate, dipentaerythritol monohydroxy penta(meth)acrylate, alkyl-modified dipentaerythritol penta(meth)acrylate, Viscoat V #802 (number of functional group=8), Viscoat V #1000 (number of functional groups=average of 14). "Viscoat" is a registered trademark name by Osaka Organic Chemical Industry Co. Ltd. Those having functional groups of 16 or more are such as the acrylate compounds obtained by using Boltorn H20 (16 functional groups), Boltorn H30 (32 functional groups), Boltorn H40 (64 functional groups) sold by Perstorp Specialty Chemicals as the raw materials.

In addition, as other polymerizable compounds, polymerizable compounds having a bisphenol structure is further included. These compounds are suitable in assisting uniform alignment and film forming ability of polymerizable liquid crystal compounds. Examples of the polymerizable bisphenol derivatives are represented by formula (N-1) to formula (N-6).

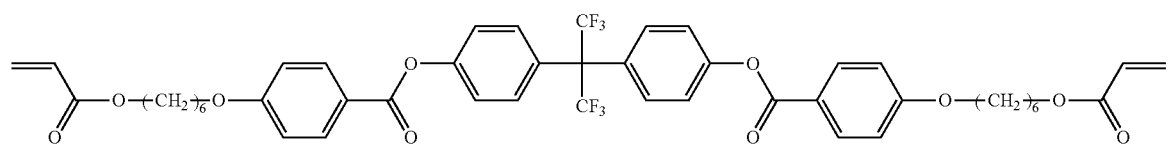

(N-1)

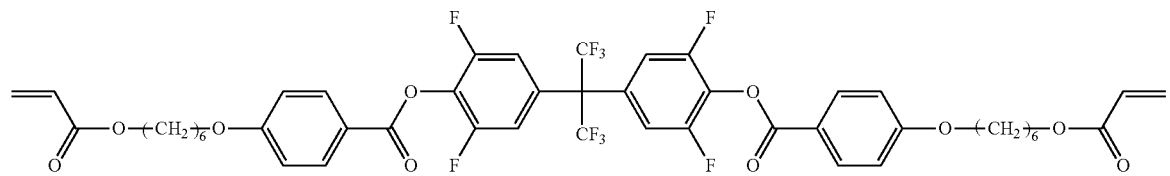

(N-2)

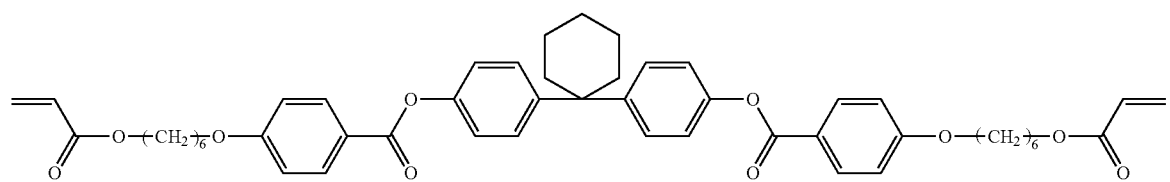

(N-3)

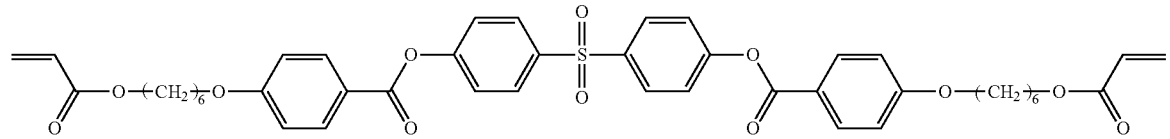

(N-4)

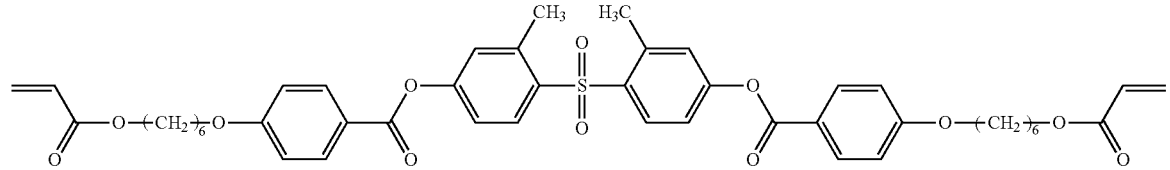

(N-5)

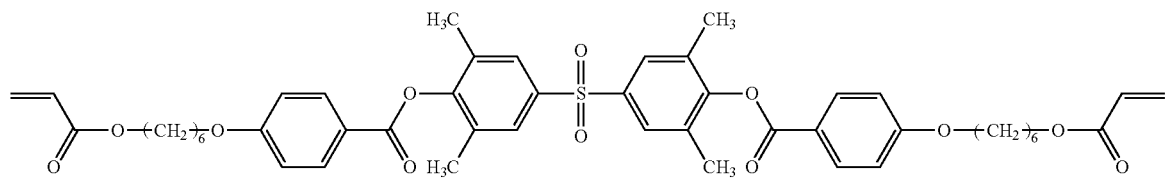

(N-6)

The other polymerizable compounds may be used alone, or may be used in a combination of two or more. Furthermore, these compounds may be commercially available products.

[6. Additive]

In order to optimize the polymerization rate, a polymerization initiator may be added to the polymerizable liquid crystal composition. The polymerization initiators are for example, photo-radical initiators. Examples of photo-radical initiators are such as 2-hydroxy-2-methyl-1-phenyl-propan-1-one (Darocur 1173), 2,2-dimethoxy-1,2-diphenylethan-1-one (Irgacure 651), 1-hydroxy-cyclohexyl-phenyl-ketone (Irgacure 184), Irgacure 127, Irgacure 500 (a mixture of Irgacure 184 and benzophenone), Irgacure 2959, Irgacure 907, Irgacure 369, Irgacure 379, Irgacure 754, Irgacure 1300, Irgacure 819, Irgacure 1700, Irganox cure 1800, Irgacure 1850, Irgacure 1870, Darocur 4265, Darocur MBF, Darocur TPO, Irgacure 784, Irgacure 754, Irgacure OXE01, Irgacure OXE02, Adeka optomer N-1919, Adeka cruise NCI-831 and Adeka cruise NCI-930, and the like. The above "Darocur" and "Irgacure" are registered trademark names of products sold by BASF Japan Co. Ltd., and the above "Adeka optomer" and "Adeka cruise" are both the registered trademark names of products sold by ADEKA Co. Ltd.

The above photo-radical initiators may further include p-methoxyphenyl-2,4-bis (trichloromethyl) triazine, 2-(p-butoxystyryl)-5-trichloromethyl-1,3,4-oxadiazole, 9-phenylacridine, 9,10-benzphenazine, mixtures of benzophenone/Michler's ketone, mixtures of hexaarylbiimidazole/mercaptobenzimidazole, 1-(4-isopropylphenyl)-2-hydroxy-2-methylpropan-1-one, benzyl dimethyl ketal, 2-methyl-1-[4-(methylthio) phenyl]-2-morpholinopropane-1-one, mixtures of 2,4-diethyl xanthone/methyl p-dimethylaminobenzoate, and mixtures of benzophenone/methyl triethanolamine, and the like.

Based on the total amount of the polyfunctional polymerizable liquid crystal compound, the addition amount of the photo-radical initiator included in the polymerizable liquid crystal composition preferably has a weight ratio from 0.0001 to 0.20. More preferably, the weight ratio is in the range from 0.001 to 0.15. Even more preferably, the range is from 0.01 to 0.15. The above photo-radical initiator may be used alone, or may be used in a combination of two or more. Furthermore, these polymerization imitators may be commercially available products.

Furthermore, these photo-radical polymerization initiators may be used with the addition of sensitizers. Examples of sensitizers are such as, isopropylthioxanthone, diethylthioxanthone, ethyl-4-dimethylamino benzoate (Darocur EDB), 2-ethylhexyl-4-dimethylaminobenzoate (Darocur EHA), and the like. The above sensitizers may be used alone, or may be used in a combination of two or more. Furthermore, these sensitizers may be commercially available products.

In order to control the polymerization reaction rate and the mechanical properties of the polymer, chain transfer agents may be added to the polymerizable liquid crystal composition. By using the chain transfer agents, the reaction rate and chain length of the resulting polymer may be controlled. By increasing the amount of the chain transfer agent, the polymerization reaction rate is lowered, and the length of the polymer chain is reduced. The preferred chain transfer agents are thiol compounds and styrene dimers. The chain transfer agents may be used alone, or may be used in a combination of two or more. Furthermore, these chain transfer agents may be commercially available products.

The thiol based chain transfer agents are for example, monofunctional thiols such as dodecanethiol, 2-ethylhexyl-3-mercaptopropionate, and the like, polyfunctional thiols such as trimethylolpropane tris (3-mercaptopropionate), pentaerythritol tetrakis (3-mercaptopropionate), 1,4-bis (3-mercapto butyryloxy) butane (Karenz MT BD 1), pentaerythritol tetrakis (3-mercaptobutyrate) (Karenz MT PE1), and 1,3,5-tris (3-mercapto butyloxyethyl)-1,3,5-triazine-2,4,6(1H,3H,5H)-trione (Karenz MT NR1), and the like. The name "Karenz" is a registered trademark name from Showa Denko K. K.

The styrene dimer based chain transfer agents are for example, 2,4-diphenyl-4-methyl-1-pentene and 2,4-diphenyl-1-butene, and the like.

For the polymerizable liquid crystal composition, it is possible to add a polymerization preventer to prevent the initiation of polymerization during storage. Known polymerization preventers may be used, wherein the preferred examples are such as 2,5-di(t-butyl) hydroxy toluene (BHT), hydroquinone, methylene blue, diphenyl picric acid hydrazide (DPPH), phenothiazine, nitroso compounds such as N,N-dimethyl-4-nitroso aniline and the like, o-hydroxybenzophenone, and benzothiazine derivatives such as 2H-1,3-benzothiazine-2,4-(3H)-dione, and the like.

In order to improve the storage stability of the polymerizable liquid crystal composition, it is possible to add a polymerization inhibitor. In the situation where radical occurs in the polymerizable liquid crystal composition, the polymerization reaction of the polymerizable compound is promoted. In order to prevent such a situation, it is preferable that a polymerization inhibitor is added. Polymerization inhibitors that may be used are such as phenolic antioxidants, sulfur antioxidants and phosphorus acid antioxidants.

In order to improve the weather resistance of the polymerizable liquid crystal composition, UV absorbers, light stabilizers (radical scavengers) and antioxidants may be further added.

Examples of UV absorbers are such as, Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, Adekastab LA-32, Adekastab LA-34, Adekastab LA-36, Adekastab LA-31, Adekastab 1413 and Adekastab LA-51, and the like. The name "Tinuvin" is a registered trademark name of BASF Japan Co. Ltd, wherein "Adekastab" is a registered trademark name of ADEKA. The UV absorbers may be used alone, or may be used in a combination of two or more. Furthermore, these UV absorbers may be commercially available products.

Examples of light stabilizers are such as Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, 5060, Tinuvin 5151, Chimassorb 119FL, Chimassorb 944FL, Chimassorb 944LD, Adekastab LA-52, Adekastab LA-57, Adekastab LA-62, Adekastab LA-67, Adekastab LA-63P, Adekastab LA-68LD, Adekastab LA-77, Adekastab LA-82, Adekastab LA-87, Cyasorb UV-3346 from Cytek Co. Ltd and Good-rite UV-3034 from Goodrich Co. Ltd, and the like. The name "Chimassorb" is a registered trademark name from BASF Japan Co. Ltd. The light stabilizers may be used alone, or may be used in a combination of two or more. Furthermore, these light stabilizers may be commercially available products.

Examples of antioxidants are such as, Adekastab AO-20, AO-30, AO-40, AO-50, AO-60, AO-80 from ADEKA, Sumilizer BHT, Sumilizer BBM-S, Similizer GA-80 sold by Sumimoto Chemical Co. Ltd., and Irganox 1076, Irganox 1010, Irganox 3114 and Irganox 245 sold by BASF Japan Co. Ltd, and the like. The antioxidants may be used alone, or may be used in a combination of two or more. Furthermore, these antioxidants may be commercially available products.

In order to control the adhesion to the substrate, a silane coupling agent may be added to the polymerizable liquid crystal composition. Examples of silane coupling agents are such as, vinyl trialkoxysilane, 3-isocyanate propyl triethoxysilane, N-(2-aminoethyl)-3-aminopropyl trialkoxysilane, N-(1,3-dimethyl butylidene)-3-(trialkoxysilyl)-1-propanamine, 3-glycidoxypropyl trialkoxysilane, 3-chloro-trialkoxysilane, 3-acryloxy propyl trimethoxysilane, 3-methacryloxypropyl trialkoxysilane, and the like. Furthermore, in the above alkoxysilanes, the silane coupling agent used may be a dialkoxysilane where one of the alkoxy groups (out of 3) may be substituted with a methyl. The above silane coupling agents may be used alone, or may be used in a combination of two or more. Furthermore, these silane coupling agents may be commercially available products.

[Optical Anisotropical Body]

The present invention also relates to an optical anisotropical body formed by the polymerizable liquid crystal composition of the present invention. Liquid crystal film is a type of optically anisotropical body, and for example, can be obtained by the following steps.

(1) The polymerizable liquid crystal composition or its solution thereof is directly coated onto a supporting substrate in the fluidic state to form a coating film.

(2) The coating film is irradiated with light so as to polymerize the polymerizable liquid crystal composition, wherein the polymerizable liquid crystal composition in the coating film is formed in a liquid crystal state and where the alignment is fixed.

The material of the supporting substrate that may possibly be used are such as glass and plastic, and the like. Examples of plastics are such as polyimide, polyamideimide, polyamide, polyetherimide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resins, polyvinyl alcohol, polypropylene, cellulose, triacetyl cellulose and partially saponified product thereof, epoxy resins, phenol resins, and cycloolefin resins, and the like. The supporting substrate is normal sheet shaped or film shaped.

Cycloolefin resins are for example, norbornene resins, dicyclopentadiene resins, and the like, but are not limited thereto. Among these, those having no unsaturated bonds, or having unsaturated bonds that are hydrogenated may be suitably used. Examples are such as ring-opened (co)polymer hydrogenated product of 1 or 2 or more kinds of norbornene monomers, addition (co)polymer of 1 or 2 or more kinds of norbornene monomers, addition copolymer of norbornene monomer and olefin monomer (ethylene, α-olefin etc.), addition copolymer of norbornene monomer and cycloolefin monomer (cyclopentene, cyclooctene, 5,6-dihydro-dicyclopentadiene etc.), and modified products of the above, and the like. More specifically, ZEONEX, XEONOR (co-registered trademark, made by Nippon Zeon Co. Ltd), ARTON (registered trademark, made by JSR Co. Ltd.), TOPAS (registered trademark, made by Ticona Co. Ltd.), APEL (registered trademark, made by Mitsui Chemicals Co. Ltd), Esushina (registered trademark, made by Sekisui Chemicals Co. Ltd.) and OPTOREZ (registered trademark, made by Hitachi Chemicals Co. Ltd.) may be listed.

The film made of plastic (plastic film) used as the supporting substrate may be an uniaxially stretched film or may be a biaxially stretched film. These films for example, may be subjected to hydrophilic treatment such as corona treatment or plasma treatment, and the like, or surface treatment such as hydrophobic treatment, and the like. There is no particular limitation regarding the method of hydrophilic treatment, and from the viewpoint of adhesion, corona treatment and plasma treatment are preferred, and plasma treatment is most preferred. The plasma treatment reported in the methods disclosed in Japanese Laid Open Publication No. 2002-226616 and Japanese Laid Open Publication No. 2002-121648 may be used. Furthermore, in order to improve the adhesion between the liquid crystal film and the plastic film, it is possible to form an anchor coat layer. If such an anchor coat layer is intended for improving the adhesion of the liquid crystal film and the plastic film, then there is no problem regardless of whether an inorganic material or an organic material is used. Furthermore, the plastic film may be a laminated film. Instead of the plastic film, it is also possible to use metal substrates such as aluminum, iron and copper etc. with a slit-like grooves on the surface, or glass substrates such as alkali glass with slit-like etching on the surface, borosilicate glass and flint glass etc.

For these supporting substrates of a glass substrate or a plastic film and the like, prior to forming a coating film of the polymerizable liquid crystal composition, in the case of forming a liquid crystal film having homogeneous alignment and hybrid alignment, it is possible to first perform physical or mechanical surface treatment such as rubbing, and the like. In the case of forming a liquid crystal film with homeotropic alignment, although surface treatments such as rubbing etc. is generally not carried out, however, to prevent alignment defect and the like, it is also possible to perform rubbing. Although any methods may be employed for rubbing treatment, the methods generally used are such as a method where a rubbing cloth made from materials such as rayon, cotton, and polyamide etc. is winded onto a metal roll, wherein the roll is rotated in motion while being in contact with the supporting substrate or the polymeric coating; or a method can be applied where the roll is fixed while moving the supporting substrate, and the like. The rubbing treatment may be directly performed on the supporting substrate, or where the rubbing treatment is performed on a polymeric coating, such that the polymeric coating is for instance polyimide, commonly referred to as an alignment film that is coated onto the supporting substrate in advance. The method of rubbing treatment is as described above. Depending on the type of the supporting substrate, alignment ability may also be imparted through inclined vapor deposition of silicon oxide on the surface.

In the case of the polymerizable liquid crystal composition of the present invention, a homeotropic alignment is obtained regardless of whether if the above surface treatment is performed or not and whether if an alignment film is used or not.

For applying the polymerizable liquid crystal composition or a solution thereof, in order to obtain a uniform film thickness, the coating methods used are for example, spin coating method, micro gravure coating method, gravure coating method, wire bar coating method, dip coating method, spray coating method, meniscus coating method and die coating method. In particularly, in methods such as wire bar coating where shear stress is applied when coating the polymerizable liquid crystal composition, it is possible to control the alignment of the polymerizable liquid crystal composition without performing surface treatment of the substrate by rubbing.

In the case of applying a solution of the polymerizable liquid crystal composition of the present invention, in order to form a polymerizable liquid crystal layer having a homogeneous thickness on the supporting substrate after coating, heat treatment may be performed. Heat treatment for example can be performed by using a hot plate, a drying oven, or by blowing warm air or hot air, and the like. In the present invention, "polymerizable liquid crystal layer" intends to mean the layers of the polymerizable liquid crystal composition.

The preferred ranges of the temperature and time for the heat treatment of the coated film, the wavelength of light used for light irradiation, the amount of light irradiated from a light source etc., may vary depending on the type and composition ratio of the compound used in the polymerizable liquid crystal composition, whether a photo-polymerization initiator is added or not, and the addition amount etc. That is, the conditions of the temperature and time of heat treatment of the coated film, the wavelength of the light used for light irradiation, and the amount of light irradiated from a light source as described below is merely used to illustrate an approximate range.

The heat treatment of the coated film is preferably carried out under the conditions where a uniform alignment of the polymerizable liquid crystal can be obtained. It may be carried out above the liquid crystal phase transition point of the polymerizable liquid crystal composition. An example of the heat treatment method is such as a method where the coating film is heated to a temperature where the polymerizable liquid crystal composition exhibits a nematic liquid crystal phase, and wherein the polymerizable liquid crystal composition in the coating film is formed to have a nematic alignment. In the temperature where the polymerizable liquid crystal composition exhibits a nematic liquid crystal phase, it is possible to form a nematic alignment by changing the temperature of the coating film. In such a method, the coating film is heated to the high temperature region within the above temperature range so that the nematic alignment in the coating film is near completion, and the temperature is lowered such that the alignment can be further ordered. In the case of any of the heat treatment methods described above, the heat treatment temperature is from room temperature to 150° C. From the viewpoint of uniform alignment, the temperature range is preferably from room temperature to 120° C., and the range is more preferably from room temperature to 100° C. The heat treatment time is from 5 seconds to 2 hours. The time range is preferably from 10 seconds to 40 minutes, and the range is more preferably 20 seconds to 20 minutes. In order to increase the temperature of the layer composed of the polymerizable liquid crystal composition to a predetermined temperature, it is preferable that the heat treatment time is 5 seconds or more. In order to prevent low productivity, the heat treatment time is preferably controlled within 2 hours. In this way, the polymerizable liquid crystal layer can be obtained.

For polymerization through light irradiation, it is possible to fix the alignment state of the polymerizable liquid crystal compound. The wavelength of light used for light irradiation is not particularly limited. Electron beam, ultraviolet light, visible light, infrared light (heat wave) etc. may be utilized. From the viewpoint of polymerizability, the wavelength range is preferably 150 nm to 500 nm, more preferably 250 nm to 450 nm, and even more preferably 300 nm to 400 nm. Examples of the light source are such as, low pressure mercury lamps (germicidal lamp, fluorescent chemical lamp, black light), high pressure discharge lamps (high pressure mercury lamp, metal halide lamp), short arc discharge lamps (ultrahigh pressure mercury lamp, xenon lamp, mercury xenon lamp). Preferable examples of the light source are such as metal halide lamp or xenon lamp, ultra-high pressure mercury lamp and high pressure mercury lamp. It is possible to select the wavelength range of the irradiated light source by installing filters between the light source and the polymerizable liquid crystal layer such that only a specific wavelength range may pass through. The amount of light emitted from the light source is at 2 to 5000 mJ/cm$^2$ at the time it reaches the coating film surface. From the viewpoint of polymerizability, the amount of light is preferably in the range from 10 to 3000 mJ/cm$^2$, more preferably in the range from 100 to 2000 mJ/cm$^2$. The preferred temperature at the time of light irradiation is in the same range as the heat treatment described above. Furthermore, the polymerization environment may be possible under any of a nitrogen atmosphere, inert gas atmosphere and air atmosphere. From the viewpoint of improving curability, nitrogen atmosphere or inert gas atmosphere is preferred.

The thickness of the optical anisotropical body may be an appropriate thickness based on the retardation and birefringence of the optical anisotropical body (the value of optical anisotropy).

In general, from the viewpoint of the convenience in design and performance of the optical element, it is preferably from 0.05 to 100 more preferably from 0.1 to 50 µm, and even more preferably from 0.5 to 20 µm.

From the viewpoint of the convenience in design and performance of the optical element, the haze value of the optical anisotropical body is preferably 1.5% or less, and more preferably 1.0% or less. From the viewpoint of the convenience in design and performance of the optical element, the transmittance in the visible light region is preferably 80% or more, and more preferably 90% or more.

The optical anisotropical body obtained by using the polymerizable liquid crystal composition of the present invention is expected to have a low haze value as indicated above.

The optical anisotropical body may also be used as an optical element that is integrated with polarizers, and in such situation, it is disposed at an outer side of the liquid crystal cell. On the other hand, when the optical anisotropical body is an optical compensation element, since there is none or few impurities that is eluted out when liquid crystals are filled into the cell, it is possible for the body to be disposed inside the liquid crystal cell. For example, by using the method disclosed in Japanese Laid Open Publication No. 2008-019434, it is possible to further improve the function of a color filter by forming a polymerizable liquid crystal layer of the present invention on the color filter. Furthermore, the type of polarizer used in the optical element that can be applied as the optical anisotropical body is not particularly limited, and besides the widely applied iodine-doped absorptive polarizer, the reflective type polarizer of wire grid polarizer etc. for optical compensation may be suitably used.

EXAMPLES

The following examples are not intended to limit the scope of the present invention.

The "glass substrate" refers to the Eagle XG manufactured by Corning Inc.

The "polyimide substrate" refers to a polyimide film obtained by coating a Lixon aligner (trademark) PIA-5370 manufactured by JNC Corporation onto a glass substrate, which is dried at 80° C. for 3 minutes and baked at 230° C. for 30 minutes.

The "TAC substrate" refers to TACPHAN (trademark), which is a triacetyl cellulose film having a thickness of 80 μm.

The "COP substrate" refers to the product obtained by performing hydrophilic treatment on the surface of a ZEONOR (trademark) film/ZEONOR (trademark) 1600R. The ZEONOR (trademark) film/ZEONOR (trademark) 1600R is a cycloolefin polymer film manufactured by Nippon Zeon Co. Ltd. The hydrophilic treatment was performed by using an atmospheric pressure plasma surface treatment device (AP-T02-L). For the hydrophilic treatment, besides the methods mentioned in the present disclosure, the methods disclosed in Japanese Laid Open Publication No. 2002-226616 may be used. The contact angle between the COP substrate and pure water is 30° at 25° C. The contact angle was measured by a contact angle meter CA-A manufactured by Kyowa Interface Science Co. Ltd.

[Conformation of Alignment]

The conformation of alignment is performed by the following steps.
(1) The substrate with an optical anisotropical body is sandwiched between two crossed nicols disposed polarizers.
(2) The substrate was observed from the front direction to confirm the presence or absence of light leakage. If light leakage is not visually observed, the alignment of the optical anisotropical body was judged as "good". If light leakage is visually observed, the alignment of the optical anisotropical body was judged as "poor".
(3) (a) when viewed from the front, besides light leakage, it displays a dark field view, and (b) when viewed from any of the top, bottom, left, right directions, it displays a bright field view, then such optical anisotropical body is judged as having "homeotropic alignment".

[Measurement by Using Polarization Analyzer]

Retardation was measured by using OPTIPRO polarization analyzer manufactured by Shintech Inc. A polarized light having a wavelength of 550 nm was irradiated on the substrate with an optical anisotropical body.

The irradiation angle of the polarized light was measured at 5 degree increments. The irradiation angle of the polarized light is from −50 degrees to 0 degrees, and from 0 degrees to 50 degrees when the normal direction of the film surface is 0 degree. The retardation is defined as having a relation of Δn×d, wherein Δn represents optical anisotropy and d is the optical path length of the measured light passing through the optical anisotropical body.

[Evaluation of Heat Resistance]

The evaluation of heat resistance is performed by the following steps.
(1) The retardation of the substrate with an optical anisotropical body is measured by the measuring light with incident angle of +40 degrees, and defined as Re1.
(2) The substrate was baked in an oven at 200° C. for 30 minutes.
(3) The retardation of the baked substrate with an optical anisotropical body is measured by the measuring light with incident angle of +40 degrees, and defined as Re2.
(4) If the Re2/Re1 value is 0.9 or more, then the heat resistance of the optical anisotropical body is judged as "good", and if it is less than 0.9, then the heat resistance of the optical anisotropical body is judged as "poor".

[Film Thickness Measurement]

The film thickness of the optical anisotropical body is measured with a fine shape measuring apparatus. The fine shape measuring apparatus is the Alpha-step IQ from KLA TENCOR Corporation.

The thickness of the optical anisotropical body on the glass substrate is measured by cutting off the glass portion and removing the optical anisotropical body from the glass substrate with an optical anisotropical body for measurement.

[Evaluation of Solvent Resistance]

The solvent resistance of the substrate with an optical anisotropical body is evaluated by the following steps.
(1) The substrate with an optical anisotropical body is baked in an oven at 200° C. for 30 minutes,
(2) Next, the thickness of a cured film of the polymerizable liquid crystal compound of the substrate was measured, and designated as "thickness before immersion",
(3) Subsequently, the substrate is immersed in an equivalent amount mixture solution of NMP (N-methyl-2-pyrrolidone) and BC (ethylene glycol monobutyl ether) at 50° C. for 5 minutes,
(4) Next, the thickness of the cured film of the polymerizable liquid crystal compound of the substrate was measured, and designated as "thickness after immersion".

In the case where thickness after immersion/thickness before immersion is 0.9 or more, the solvent resistance is evaluated as "good", and when it is below 0.9, the solvent resistance is evaluated as "poor".

(M-1-1-1)
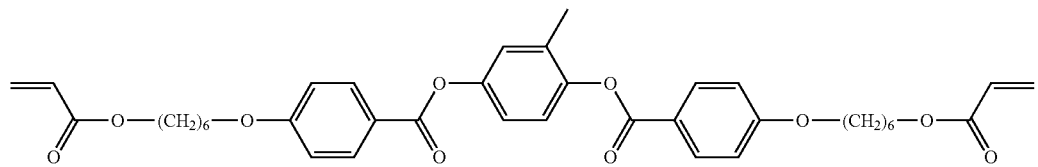
(M-1-1-2)
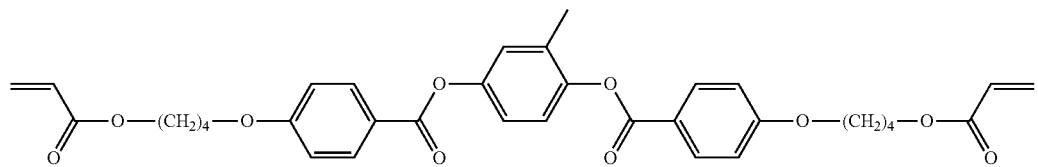
(M-1-7-1)
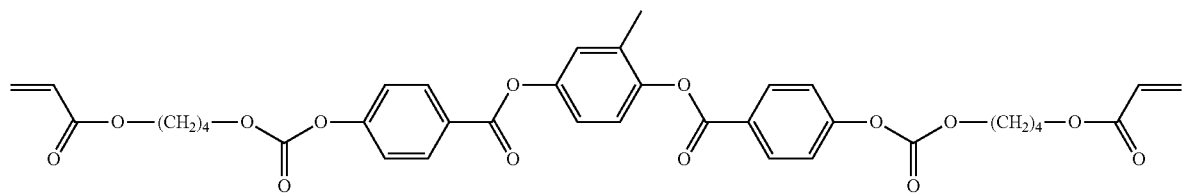
(M-1-22-1)
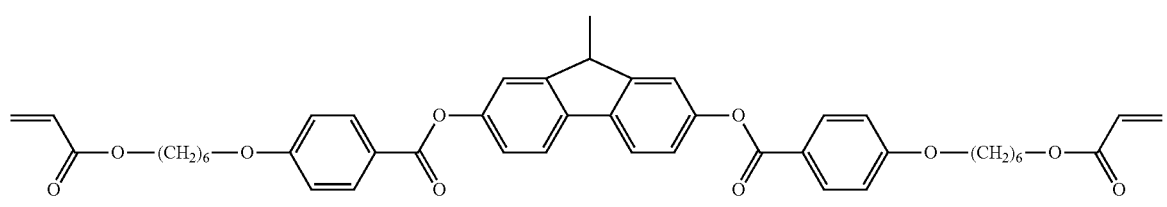
(M-1-22-2)
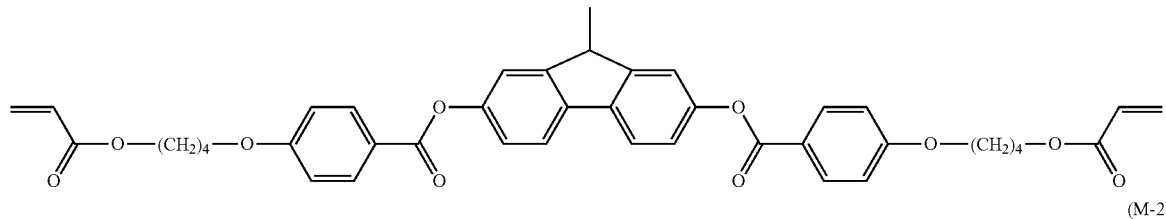
(M-2-11-1)
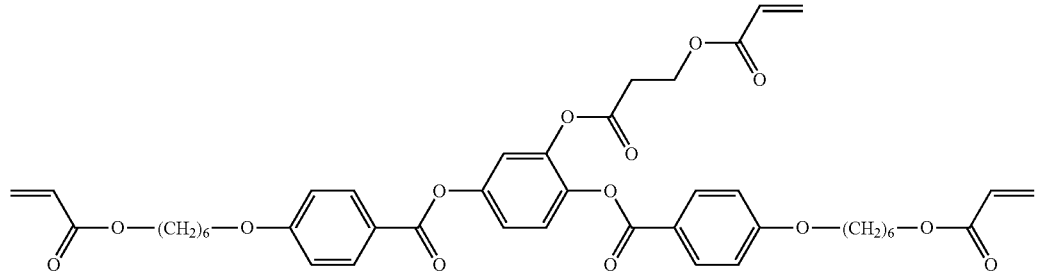
(A-3-1)
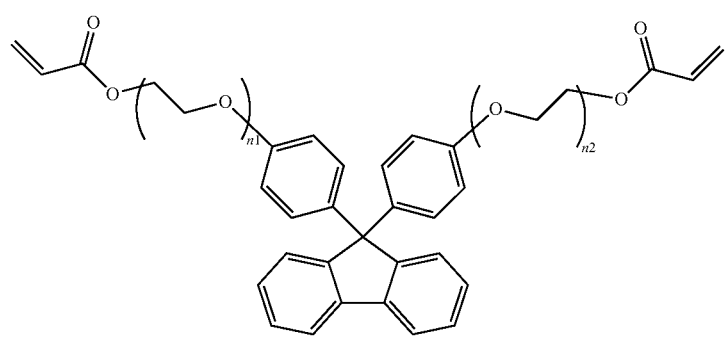

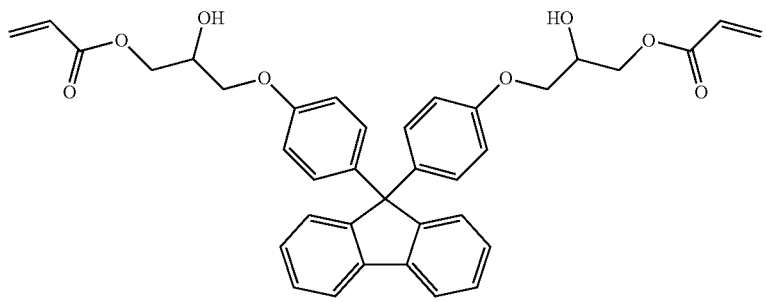
(A-2-1)

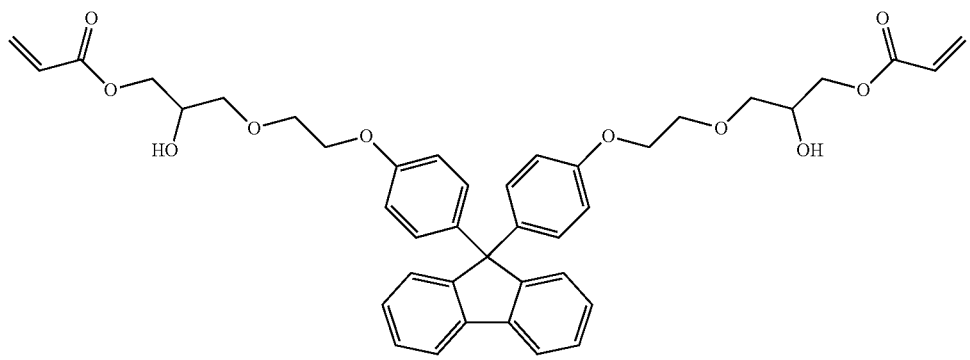
(A-6-1)

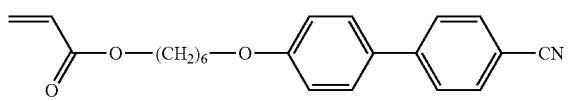
(M-3-1)

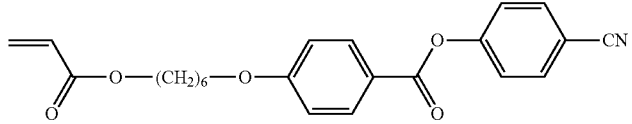
(M-3-2)

Compound (M-1-1-1) and compound (M-1-1-2) were synthesized by using the methods disclosed in Makromol. Chem., 190, 3201-3215 (1998).

Compound (M-1-7-1) was synthesized by using the same methods disclosed in the WO97/00600 pamphlet.

Compound (M-1-22-1) and compound (M-1-22-2) were synthesized by using the methods disclosed in Japanese Laid Open Publication No. 2003-238491.

Compound (M-2-11-1) was synthesized by using the methods disclosed in Japanese Laid Open Publication No. 2008-100982.

Compound (A-3-1) was OGSOL EA-0200 (n1+n2=2), and compound (A-6-1) uses ONF-1. Furthermore, GA-1000 (hereinafter referred to as compound (GA-1000)) having a diepoxy acrylate portion was used. These compounds were produced by Osaka Gas Chemicals.

Compound (A-2-1) manufactured by Changzhou Tronly New Electronic Materials Co. Ltd was used.

Compound (M-2-1) was synthesized using the same method disclosed in Macromolecules, 26, 6132-6134 (1993). Compound (M-3-2) was synthesized by using the method disclosed in Makromol. Chem. 183, 2311-2321 (1982).

[Preparation of Composition 1]

Approximately 10 parts by weight of compound (GA-1000), 45 parts by weight of compound (M-1-1-1), 45 parts by weight of compound (M-1-22-1), 5 parts by weight of Irgacure (trademark) 907, 0.25 parts by weight of BYK-333, 0.1 parts by weight of Irganox 1076 were respectively weighed and mixed with 400 parts by weight of cyclopentane, and the mixture was heated at 40° C. for 1 hour. Thereafter, the mixture was passed through a membrane filter having a pore size of 0.1 μm, and was named as composition 1.

[Preparation of Compositions 2 to 13]

Compositions 2 to 13 was obtained through the same preparation process as in composition 1 by mixing the components in the weight ratio shown in Table 1. Except for the drying temperature, the values in Table 1 represents the weight ratio of the materials of these compositions.

Example 1

The optical anisotropical body was formed by the following process.

(1) Composition 1 was spin coated onto the glass substrate at 1000 rpm for 15 seconds,
(2) dried at 80° C. for 3 minutes,
(3) allowed to stand for 3 minutes at 25° C., 50% rh, to accomplish example 1.
(4) At 25° C., 50% rh, irradiation was performed using ultra-high pressure mercury lamp with a 365 nm UV light for 5.6 seconds at 90 mW/cm$^2$.

The ultra-high pressure mercury lamp used has a power consumption of 500 W as manufactured by Ushio Inc.

The film thickness of the optical anisotropical body is 1.0 µm. The optical anisotropical body has good alignment. FIG. 1 shows the measurement results by using the polarization analyzer device.

Examples 2 to 11, Comparative Examples 1 to 3

Examples 2~11, examples 18~20, comparative examples 1~3 and comparative example 6 was prepared in the same manner as in example 1. However, in replacement of the composition 1 used in process (1) of example 1, a weight ratio shown in Table 1 was used instead. Furthermore, in replacement of the temperature used in process (2) of example 1, the drying temperature (T/° C.) shown in Table 1 was used instead.

In Table 1, the solvent resistance, heat resistance and alignment of the respective examples and comparative examples are described. The blank column in Table 1 indicates the relevant sections where confirmation was not performed. The optical anisotropical body on the substrate as confirmed in the present invention all displayed a homeotropic alignment.

TABLE 1

|  | Example 1 | Example 2 | Example 3 | Example 4 | Example 5 | Example 6 | Example 7 | Example 8 | Example 9 |
|---|---|---|---|---|---|---|---|---|---|
|  | Composition 1 | | | | Composition 2 | | Composition 3 | Composition 4 | Composition 5 |
| Compound (GA-1000) | 10 | | | | 6 | | 10 | 0 | 10 |
| Compound (A-3-1) | 0 | | | | 0 | | 0 | 0 | 0 |
| Compound (A-2-1) | 0 | | | | 0 | | 0 | 0 | 0 |
| Compound (A-6-1) | 0 | | | | 0 | | 0 | 10 | 0 |
| Compound (M-1-1-1) | 45 | | | | 47 | | 0 | 0 | 45 |
| Compound (M-1-1-2) | 0 | | | | 47 | | 0 | 0 | 0 |
| Compound (M-1-7-1) | 0 | | | | 0 | | 0 | 45 | 0 |
| Compound (M-1-22-1) | 45 | | | | 0 | | 45 | 0 | 0 |
| Compound (M-1-22-2) | 0 | | | | 0 | | 45 | 45 | 0 |
| Compound (M-2-7-1) | 0 | | | | 0 | | 0 | 0 | 45 |
| Compound (M-3-1) | 0 | | | | 0 | | 0 | 0 | 0 |
| Compound (M-3-2) | 0 | | | | 0 | | 0 | 0 | 0 |
| Cyclopentanone | 400 | | | | 400 | | 400 | 400 | 400 |
| Irgacure-907 | 5 | | | | 5 | | 0 | 5 | 5 |
| NCI-930 | 0 | | | | 0 | | 5 | 0 | 0 |
| Irganox-1076 | 0.1 | | | | 0.1 | | 0.1 | 0.1 | 0.1 |
| BYK-333 | 0.25 | | | | 0 | | 0 | 0.25 | 0 |
| TEGO Flow 370 | 0 | | | | 0.25 | | 0.25 | 0 | 0.25 |
| Solvent resistance | Good | | | | Good | | Good | Good | Good |
| Heat resistance | Good | | | | Good | | Good | Good | Good |
| Substrate | Glass substrate | Polyimide substrate | COP substrate | TAC substrate | Glass substrate | Polyimide substrate | Glass substrate | Glass substrate | Glass substrate |
| Drying temperature (T/° C.) | 80 | 80 | 80 | 80 | 80 | 80 | 80 | 80 | 80 |
| Alignment | Good | Good | Good | Good | Good | Good | Good | Good | Good |

|  | Comparative Example 1 | Comparative Example 2 | Comparative Example 3 | Example 10 | Example 11 | Example 18 | Example 19 | Example 20 | Comparative Example 6 |
|---|---|---|---|---|---|---|---|---|---|
|  | Composition 6 | Composition 7 | Composition 8 | Composition 9 | Composition 10 | Composition 11 | Composition 11 | Composition 12 | Composition 13 |
| Compound (GA-1000) | 10 | 10 | 0 | 0 | 0 | 10 | 10 | 0 | 10 |
| Compound (A-3-1) | 0 | 0 | 0 | 0 | 12 | 0 | 0 | 0 | 0 |
| Compound (A-2-1) | 0 | 0 | 0 | 10 | 0 | 0 | 0 | 10 | 0 |

TABLE 1-continued

| | | | | | | | | | |
|---|---|---|---|---|---|---|---|---|---|
| Compound (A-6-1) | 0 | 0 | 0 | 0 | 0 | 0 | 0 | 0 | 0 |
| Compound (M-1-1-1) | 30 | 20 | 50 | 0 | 44 | 45 | 45 | 0 | 10 |
| Compound (M-1-1-2) | 0 | 0 | 0 | 45 | 0 | 0 | 0 | 45 | 0 |
| Compound (M-1-7-1) | 0 | 0 | 0 | 0 | 0 | 0 | 0 | 0 | 0 |
| Compound (M-1-22-1) | 30 | 60 | 50 | 0 | 44 | 45 | 45 | 0 | 60 |
| Compound (M-1-22-2) | 0 | 0 | 0 | 45 | 0 | 0 | 0 | 45 | 0 |
| Compound (M-2-7-1) | 0 | 0 | 0 | 0 | 0 | 0 | 0 | 0 | 0 |
| Compound (M-3-1) | 30 | 0 | 0 | 0 | 0 | 0 | 0 | 0 | 20 |
| Compound (M-3-2) | 0 | 20 | 0 | 0 | 0 | 0 | 0 | 0 | 0 |
| Cyclopentanone | 400 | 400 | 400 | 400 | 400 | 400 | 400 | 400 | 400 |
| Irgacure-907 | 5 | 5 | 5 | 0 | 0 | 5 | 5 | 0 | 0 |
| NCI-930 | 0 | 0 | 0 | 5 | 5 | 0 | 0 | 5 | 5 |
| Irganox-1076 | 0.1 | 0.1 | 0.1 | 0.1 | 0.1 | 0.1 | 0.1 | 0.1 | 0.1 |
| BYK-333 | 0 | 0 | 0 | 0 | 0 | 0.25 | 0.25 | 0 | 0 |
| TEGO Flow 370 | 0.25 | 0.25 | 0.25 | 0.25 | 0.25 | 0 | 0 | 0.25 | 0.25 |
| Solvent resistance | Poor | Poor | | Good | Good | Good | Good | Good | Poor |
| Heat resistance | Poor | Poor | | Good | Good | Good | Good | Good | Poor |
| Substrate | Glass substrate | Glass substrate | Glass substrate | Glass substrate | Glass substrate | Glass substrate | Glass substrate | Glass substrate | Glass substrate |
| Drying temperature (T/° C.) | 80 | 80 | 80 | 80 | 80 | 60 | 60 | 60 | 60 |
| Alignment | Good | Good | Poor | Good | Good | Good | Good | Good | Good |

From the results of the examples and the comparative examples, the optical anisotropical body obtained by using the polymerizable liquid crystal composition of the present invention all showed a good homeotropic alignment, and further, a good chemical strength is confirmed.

INDUSTRIAL APPLICABILITY

By using the polymerizable liquid crystal composition of the present invention, a polymerizable liquid crystal layer that allows formation of a uniform homeotropic alignment even without forming an alignment film on the supporting substrate and has excellent heat resistance and solvent resistance can be made. It is possible to form a liquid crystal film from the polymerizable liquid crystal composition, and the liquid crystal film becomes a material of the optical element including the optical compensation element.

What is claimed is:

1. A polymerizable liquid crystal composition, comprising:
a polyfunctional polymerizable liquid crystal compound and a cardo-type fluorene monomer, wherein based on a total amount of the polyfunctional polymerizable liquid crystal compound, a content of a monofunctional polymerizable liquid compound is 0% by weight.

2. The polymerizable liquid crystal composition according to claim 1, wherein the cardo-type fluorene monomer is at least one compound selected from the group of compounds represented by formula (A-1) to (A-6):

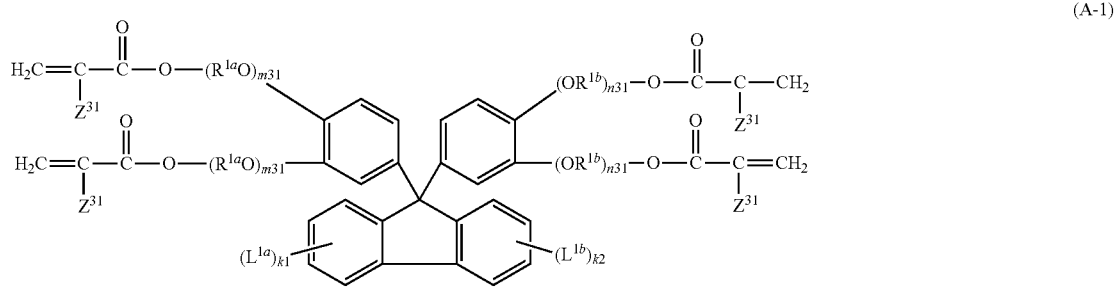

(A-1)

-continued

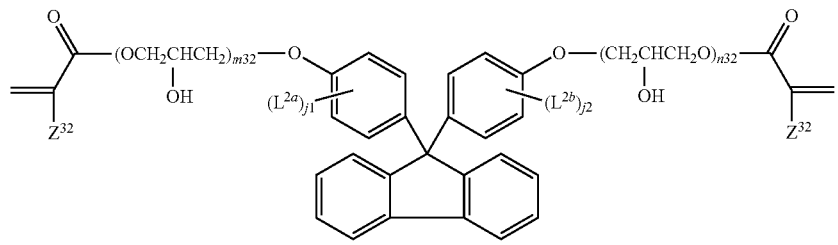
(A-2)

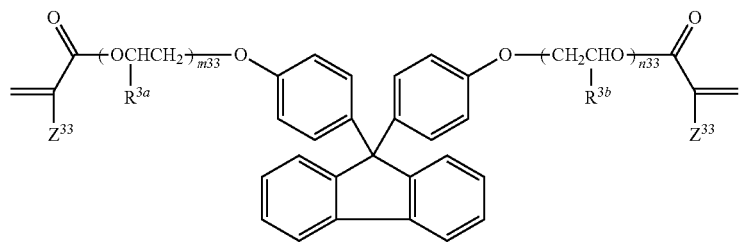
(A-3)

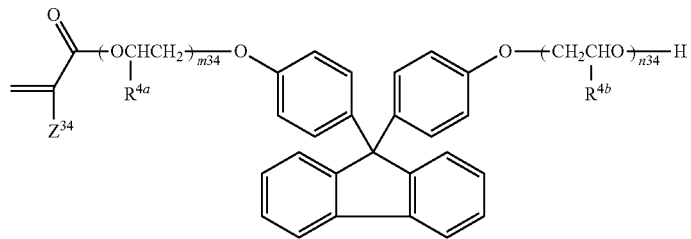
(A-4)

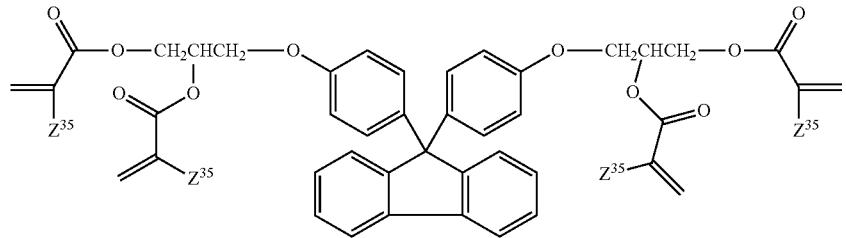
(A-5)

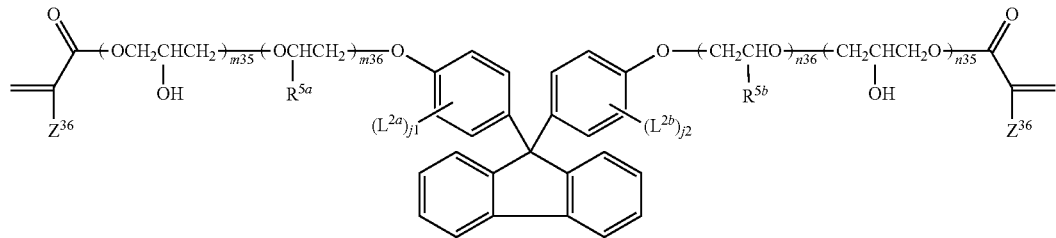
(A-6)

wherein, in formula (A-1), $L^{1a}$ and $L^{1b}$ independently represent alkyl having 1 to 4 carbons, $R^{1a}$ and $R^{1b}$ independently represent alkylene having 2 to 4 carbons, $Z^{31}$ independently represents hydrogen or methyl, k1 and k2 independently represent an integer from 0 to 4, m31 and n31 independently represent an integer from 0 to 6;

in formula (A-2), $Z^{32}$ independently represents hydrogen or methyl, m32 and n32 independently represent an integer from 1 to 3, $L^{2a}$ and $L^{2b}$ independently represent alkyl having 1 to 6 carbon, phenyl or fluorine, j1 and j2 independently represent an integer from 0 to 4;

in formula (A-3), $Z^{33}$ independently represents hydrogen or methyl, $R^{3a}$ and $R^{3b}$ independently represent hydrogen, methyl or ethyl group, m33 and n33 independently represent an integer from 0 to 3;

in formula (A-4), $Z^{34}$ represents hydrogen or methyl, $R^{4a}$ and $R^{4b}$ independently represent hydrogen or alkyl having 1 to 6 carbons, m34 and n34 independently represent an integer from 0 to 10;

in formula (A-5), $Z^{35}$ independently represents hydrogen or methyl;

in formula (A-6), $Z^{36}$ independently represents hydrogen or methyl, $R^{5a}$ and $R^{5b}$ independently represent hydrogen or alkyl having 1 to 6 carbons, $L^{2a}$ and $L^{2b}$ independently represent alkyl having 1 to 6 carbons, phenyl or fluorine, j1 and j2 independently represent an integer from 0 to 4, m35 and n35 independently represent an integer from 1 to 3, m36 and n36 independently represent an integer from 1 to 3.

3. The polymerizable liquid crystal composition according to claim 2, wherein the cardo-type fluorene monomer is at least one compound selected from the group of compounds represented by formula (A-1), formula (A-2), formula (A-3), formula (A-5) and formula (A-6).

4. The polymerizable liquid crystal composition according to claim 1, wherein a polymerizable functional group of the polyfunctional polymerizable liquid crystal compound is a (meth)acryloxy group.

5. The polymerizable liquid crystal composition according to claim 1, wherein the polyfunctional polymerizable liquid crystal compound is at least one compound selected from the group of compounds represented by formula (M-1) and formula (M-2):

6. The polymerizable liquid crystal composition according to claim 1, wherein based on a total amount of the polymerizable liquid crystal composition, a content of the polyfunctional polymerizable liquid crystal compound is from 3% by weight to 60% by weight.

7. The polymerizable liquid crystal composition according to claim 1, wherein based on a total amount of the polymerizable liquid crystal composition, a content of the cardo-type fluorene monomer is from 0.01% by weight to 15% by weight.

8. A polymerizable liquid crystal layer, obtained by applying the polymerizable liquid crystal composition according to claim 1 directly onto a support substrate.

9. The polymerizable liquid crystal layer according to claim 8, wherein the support substrate is a glass substrate.

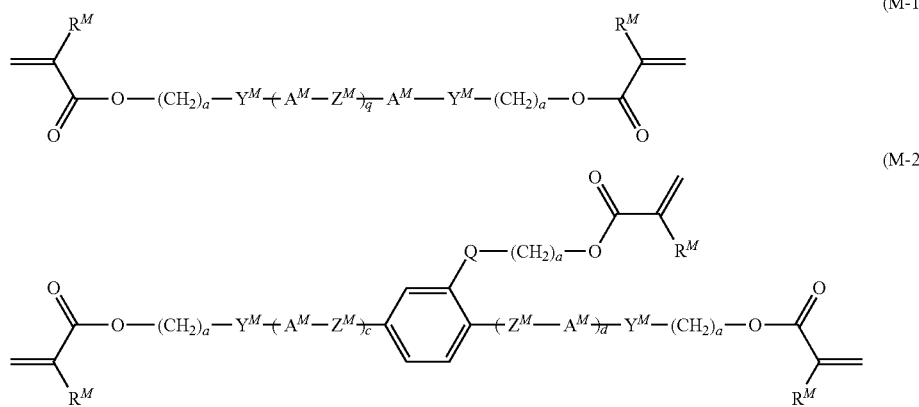

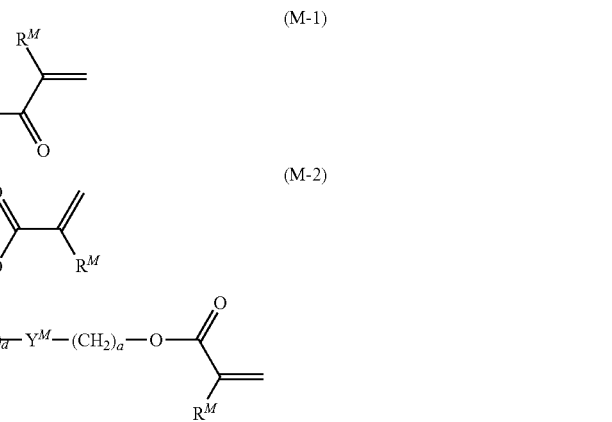

wherein, in formula (M-1) and formula (M-2), $A^M$ independently represents a divalent group selected from 1,4-phenylene, 1,4-cyclohexylene, 1,4-cyclohexenylene, pyridine-2,5-diyl, 1,3-dioxane-2,5-diyl, naphthalene-2,6-diyl or fluorene-2,7-diyl, wherein in the divalent group, at least one hydrogen may be substituted by fluorine, chlorine, cyano, hydroxy, formyl, trifluoroacetyl, difluoromethyl, trifluoromethyl, alkyl having 1 to 5 carbons, alkoxy having 1 to 5 carbons, alkoxycarbonyl having 1 to 5 carbons or alkanoyl having 1 to 5 carbons, $Z^M$ independently represents a single bond, —OCH$_2$—, —CH$_2$O—, —COO—, —OCO—, —COS—, —SCO—, —OCOO—, —CONH—, —NHCO—, —CF$_2$O—, —OCF$_2$—, —CH$_2$CH$_2$—, —CF$_2$CF$_2$—, —CH=CHCOO—, —OCOCH=CH—, —CH$_2$CH$_2$COO—, —OCOCH$_2$CH$_2$—, —CH=CH—, —N=CH—, —CH=N—, —N=CCH$_3$—, —CCH$_3$=N—, —N=N— or —C≡C—, q represents an integer from 1 to 4, c and d independently represent an integer from 0 to 3, wherein 1≤c+d≤4, a independently represents an integer from 0 to 20, $R^M$ independently represent hydrogen or methyl, $Y^M$ independently represent a single bond, —O—, —COO—, —OCO— or —OCOO—, Q represents a single bond, —O—, —COO—, —OCO— or —OCOO—.

10. The polymerizable liquid crystal layer according to claim 8, wherein the support substrate is a glass substrate coated with plastic thin film or a plastic substrate made of plastic film.

11. The polymerizable liquid crystal layer according to claim 10, wherein a plastic of the plastic thin film and the plastic film is at least one selected from polyimide, polyamide-imide, polyamide, polyether-imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resins, polyvinyl alcohol, polypropylene, cellulose, triacetyl cellulose, partially saponified product of triacetyl cellulose, epoxy resins, phenolic resins and cycloolefin resins.

12. The polymerizable liquid crystal layer according to claim 10, wherein a plastic of the plastic thin film and the plastic film is at least one selected from polyimide, polyvinyl alcohol, triacetyl cellulose, partially saponified product of triacetyl cellulose, acrylic resins, and cycloolefin resins.

13. The polymerizable liquid crystal layer according to claim 8, wherein the support substrate is a glass substrate coated with plastic thin film by rubbing treatment, corona treatment or plasma treatment on the surface, or the support substrate is a plastic substrate made of plastic film with rubbing treatment, corona treatment or plasma treatment on the surface.

14. The polymerizable liquid crystal layer according to claim 8, wherein an alignment state of the polymerizable liquid crystal composition is homeotropic alignment.

* * * * *